(12) United States Patent
Ishii et al.

(10) Patent No.: US 6,588,529 B2
(45) Date of Patent: Jul. 8, 2003

(54) BODY COVER AND STRUCTURE FOR MOTORCYCLE

(75) Inventors: Yoshihide Ishii, Iwata (JP); Yasuhiko Kitamura, Iwata (JP); Kenji Toyofuku, Iwata (JP); Hiroshi Kikuhara, Iwata (JP); Keiji Miyagi, Iwata (JP)

(73) Assignee: Yamaha Hatsudoki Kabishuki Kaisha, Iwata (JP)

( * ) Notice: Subject to any disclaimer, the term of this patent is extended or adjusted under 35 U.S.C. 154(b) by 0 days.

(21) Appl. No.: 09/681,916

(22) Filed: Jun. 26, 2001

(65) Prior Publication Data

US 2002/0007977 A1 Jan. 24, 2002

(30) Foreign Application Priority Data

| Jul. 5, 2000 | (JP) | ........ | 2000-203828 |
| Jul. 5, 2000 | (JP) | ........ | 2000-203834 |
| Jul. 5, 2000 | (JP) | ........ | 2000-203835 |
| Jul. 5, 2000 | (JP) | ........ | 2000-203837 |

(51) Int. Cl.[7] ............................................. B62D 61/02
(52) U.S. Cl. ............................ 180/219; 296/78.1
(58) Field of Search ................... 180/219; 296/78.1; 280/152.1, 152.2, 152.3, 852, 291

(56) References Cited

U.S. PATENT DOCUMENTS

| 4,413,700 A | * | 11/1983 | Shiratschi ................ 180/219 |
| 4,650,204 A | * | 3/1987 | Bothwell ................. 296/78.1 |
| 4,678,223 A | * | 7/1987 | Kishi et al. .............. 296/78.1 |
| 4,685,530 A | * | 8/1987 | Hara ....................... 180/219 |
| 4,776,422 A | * | 10/1988 | Sakuma ................... 180/219 |
| 4,964,484 A | * | 10/1990 | Buell ....................... 180/219 |
| 5,107,949 A | * | 4/1992 | Gotoh et al. .............. 220/8 |

FOREIGN PATENT DOCUMENTS

| JP | 2-53681 | * | 2/1990 |
| JP | 3-167086 | * | 3/1991 |
| JP | 10-67365 | * | 10/1998 |

* cited by examiner

*Primary Examiner*—Anne Marie Boehler
(74) *Attorney, Agent, or Firm*—Ernest A Beutler

(57) ABSTRACT

A motorcycle frame and body cover arrangement that provides a very neat appearance as well as good riding posture for the rider/operator and a co-rider and also for its good leg positioning when the vehicle is stationary. The body cover covers the major portions of the frame and engine assembly but leaves the crankcase of the engine exposed for cooling and to improve the foot area. Also, the body cover pieces are arranged so as to permit changes in styling details. Portions of the body that carry weight are supported by the frame by a sub-frame that encircles the head pipe. Also, the body configuration and seating arrangement is such that a rider can be comfortably seated behind the operator and his feet will be positioned well clear of the muffler and other running components while still maintaining a comfortable position.

23 Claims, 45 Drawing Sheets

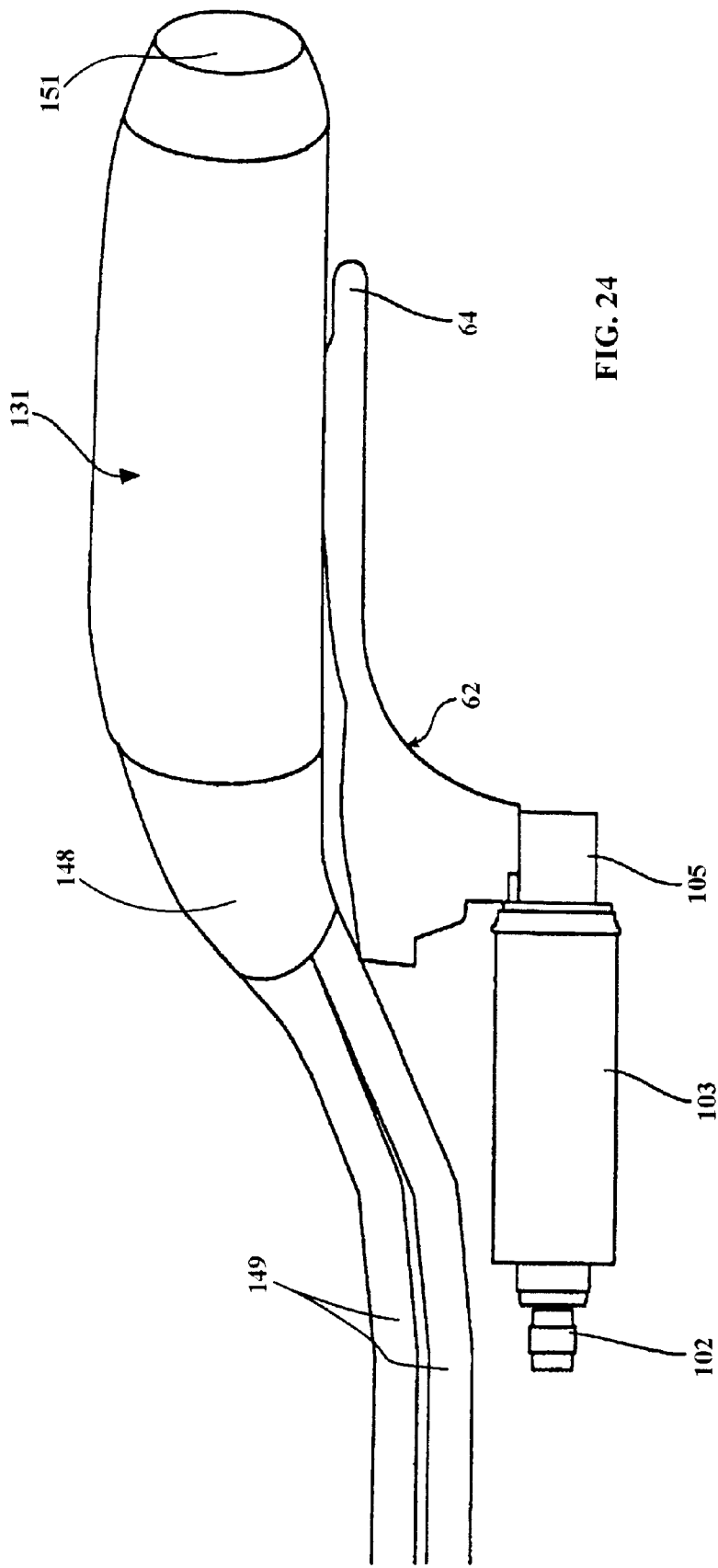

BODY COVER AND STRUCTURE FOR MOTORCYCLE

BACKGROUND OF THE INVENTION

This invention relates to a body cover and structure for a motorcycle.

In accordance with conventional motorcycle structures, the frame assembly has carried on it a number of body covers. For example, in conventional practice there is provided a footboard with a footrest for the rider seated on the seat carried by the frame assembly. In addition, a seat underside cover is disposed in the area between the seat underside and above the footrest. With the conventional structures, these two components are disposed adjacent to each other and the design can only be changed when the colors of these components are changed. Thus, this restricts the degree of freedom on the rider or manufacturer being able to vary the design.

It is, therefore, a principal object to this invention to provide an improved exterior covering for a motorcycle that is capable of increasing the degree of freedom in designing the motorcycle and particularly the body cover elements therefore.

In addition, the motorcycle frame is generally comprised of a plurality of joined frame tubes or other type frame members and the body components are fixed to these various frame elements generally by attachment brackets or stays. This is particularly true in connection with the rider footrests in that they are normally supported by brackets carried at the lower end of the frame and extending transversely outwardly there from. This has a number of disadvantages not the least of which is the load of the rider's weight and particularly through his feet is not well distributed and the frame structure becomes quite complicated and wide at lower area, where it will restrict the leaning ability of the motorcycle.

It is, therefore, a still further object to this invention to provide an improved frame assembly for a motorcycle wherein the footrests are carried by a point forwardly and above the lower part of the frame assembly so as to simplify the lower frame construction and to move the weight applied to the footrests further forwardly of the frame assembly.

In connection with the covering of the various components by the body covers, it has been conventional to provide body covers that extend over the sides of the crankcase. However, this is the area below the seat where the rider/operator sits and unduly widens the motorcycle in this area. This has several disadvantages. First, it makes the normal sitting position somewhat awkward in that the rider's legs are rather far spread apart. Also, when the vehicle is stopped and the rider places his feet on the ground to support the vehicle, he must assume a very spread position which is uncomfortable and reduces his ability to balance the weight of the machine. Furthermore, this covering of the engine reduces the ability of it to be cooled by the surrounding atmosphere.

It is, therefore, a still further object to this invention to provide an improved body cover arrangement for a motorcycle wherein the crankcase is exposed so as to reduce the width at the rider's foot area and to improve engine cooling.

SUMMARY OF THE INVENTION

A first feature of the invention is adapted to be embodied in vehicle comprised of a frame assembly including a head pipe for journalling a front wheel for steering about a steering axis and a plurality of frame members rigidly affixed to each other. A seat is carried by the frame assembly and is adapted to accommodate at least a single rider seated in straddle fashion. A rear wheel is supported by the frame assembly for suspension movement relative thereto. An engine transmission assembly is carried by and forms a part of the frame assembly for driving the rear wheel. A body cover assembly comprised of a plurality of body cover parts each of which is detachably connected to the frame assembly and substantially conceals it.

A further feature of the invention is adapted to be embodied in vehicle as set forth in the first paragraph of this section and wherein the body cover assembly is comprised of at least a foot rest adapted to support the feet of a rider seated on the seat and extending there beneath, a seat undercover covering the portion of the frame assembly beneath the seat, and boomerang covers on opposite sides said vehicle. Each of the boomerang covers has a pair of angularly related leg portions covering the area of the frame assembly beneath the seat undercover.

Another feature of the invention is adapted to be embodied in vehicle as set forth in the first paragraph of this section and wherein the frame assembly includes a sub frame fixed relative to and surrounding the head pipe. The body cover assembly is comprised of at least a pair of foot rests each of which is adapted to support a feet of a rider seated on the seat. The foot rests extending beneath the seat. The foot rests are affixed to the sub frame for supporting the rider's feet.

Still another feature of the invention is adapted to be embodied in vehicle as set forth in the first paragraph of this section and wherein the engine transmission assembly includes a crankcase in which a crankshaft is journalled for rotation about a transverse axis. The body cover assembly is formed with cut outs for exposing at least a portion of the crankcase beneath the seat so a rider can place his feet on the ground in close proximity to the crankcase and so the crankcase can be exposed to the atmosphere for cooling.

A still feature of the invention is adapted to be embodied in vehicle as set forth in the first paragraph of this section and wherein the seat extends rearwardly a distance to accept a rider passenger in tandem with a rider operator. The body cover assembly is comprised of a seat undercover covering the portion of the frame assembly beneath the seat. The engine assembly exhausts combustion products to the atmosphere through a muffler disposed below the seat undercover and above an axle about which the rear wheel rotates. A pair of tandem foot rests are each fixed to the frame assembly at a respective side thereof and forwardly of the muffler.

BRIEF DESCRIPTION OF THE DRAWINGS

FIG. 24 is a top plane view showing the arrangement for mounting the muffler and its relationship to the cushioning unit.

DETAILED DESCRIPTION

General Comments

Figure 1:
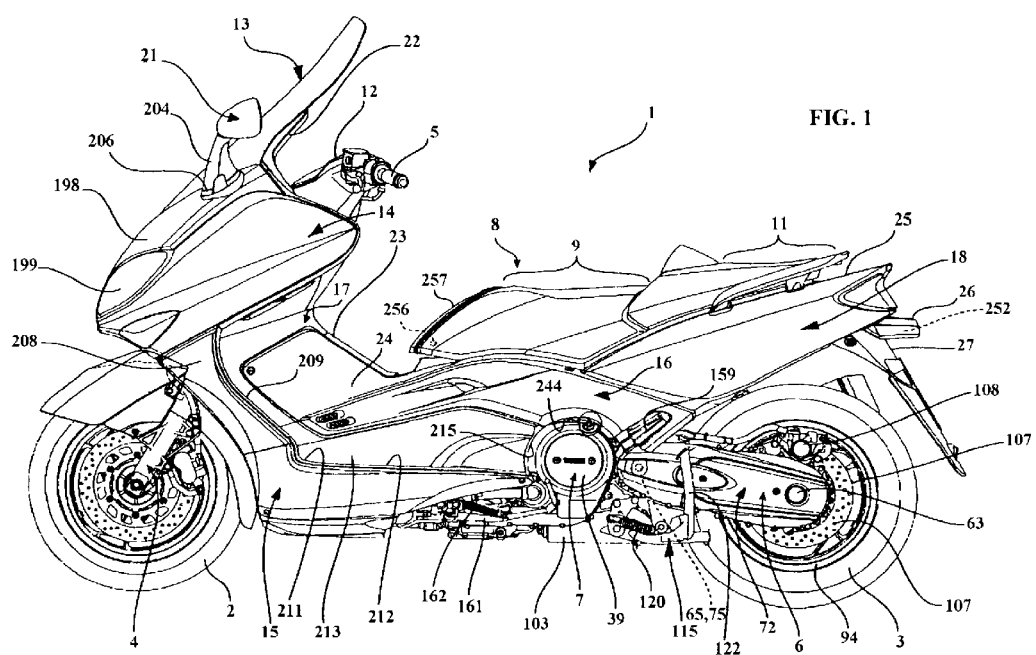
FIG. 1 is a side elevational view of a motorcycle constructed in accordance with an embodiment of the invention.
Figure 2:
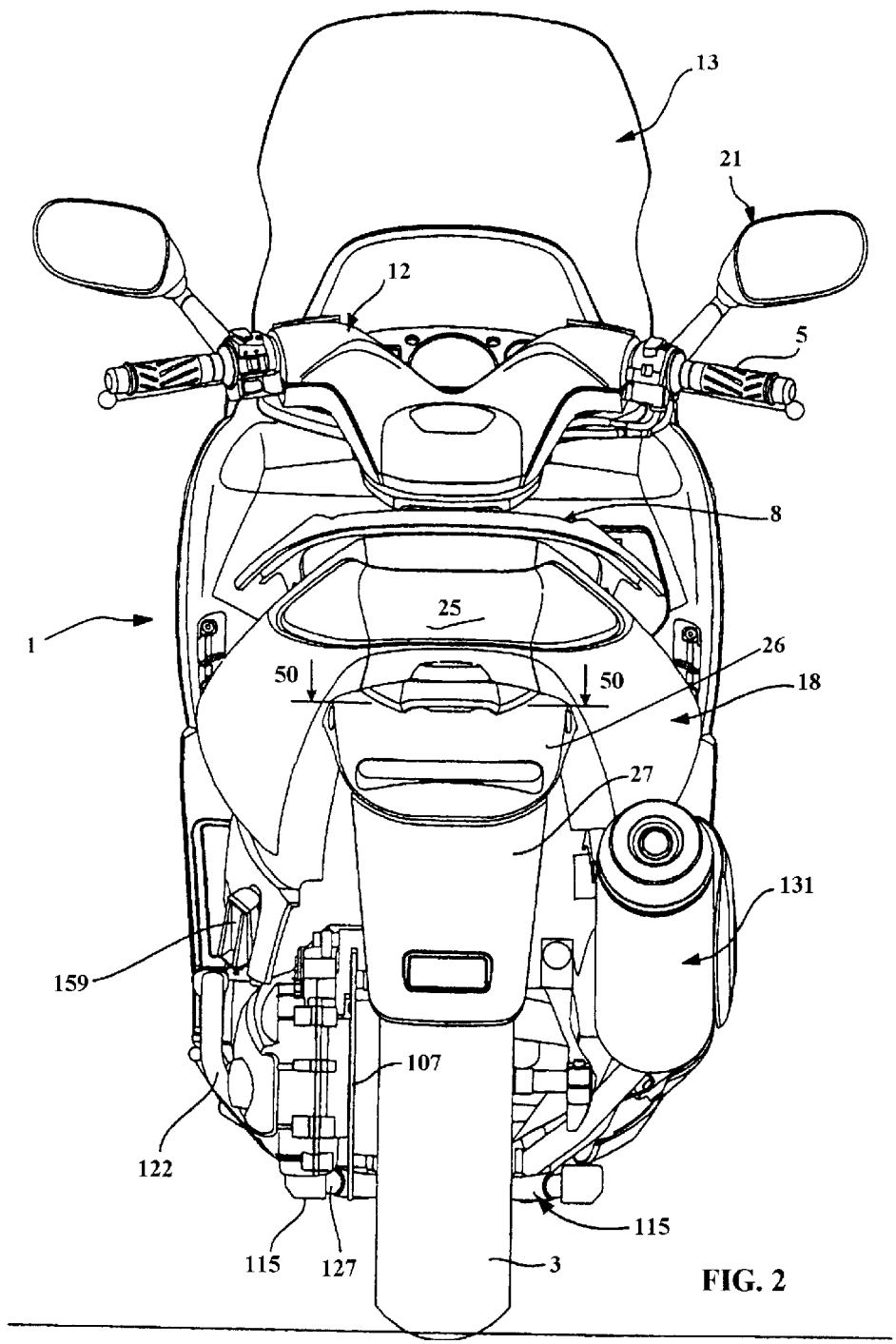
FIG. 2 is a rear elevational view of the motorcycle.

Because of the extensive scope of this disclosure, the disclosure of a motorcycle, as indicated generally by the reference numeral 1, which embodies the invention will be described first generally by reference to certain figures and then the frame construction described, the mounting for the running gear, the body, miscellaneous body features and finally a second embodiment will be described in that order. For each of these description groups, certain figures will be primarily referenced but it should be understood that a number of the components described by reference to these certain identified figures also appear in other figures than those specified.

General Overall Construction (FIGS. 1 through 4)

As has been noted, the invention is adapted to be embodied in a motorcycle or other primarily two-wheel vehicle, as indicated by the general reference numeral 1. Although the invention is described in conjunction with such a vehicle, it will be readily apparent to those skilled in the art that various facets of the invention can be utilized in other types of vehicles. Also, it should be understood that the features described herein need not all be employed in a single machine to practice the inventions.

The motorcycle 1 is comprised of a built up frame assembly which is primarily concealed by body cover parts in this group of figures but will be described in more detail later by reference to FIGS. 5–12, 14 and 15. Basically, the running gear for the motorcycle 1, all of which is mounted in the manners to be described on the frame assembly, consists of a front wheel 2 and a rear wheel 3. The front wheel 2 is dirigibly supported by the frame assembly by means of left and right front forks 4 that are steered by a handlebar assembly 5. The rear wheel 3 is mounted on the frame assembly primarily by a trailing arm arrangement, indicated generally by the reference numeral 6.

The rear wheel 3 is driven by an engine assembly, indicated generally by the reference numeral 7, through a transmission arrangement, which will also be described in more detail later.

A rider's seat, indicated generally by the reference numeral 8, is mounted in a manner to be described on the frame assembly, also to be described, and is adapted to seat a rider operator on a driver's, front seat portion 9 and an additional rider on a passenger seat portion 11.

The handlebar assembly 5 is provided with a handlebar cover indicated generally by the reference numeral 12.

The body cover assembly for the motorcycle 1 comprises a number of parts each of which is detachably connected in a separate manner to the frame assembly for reasons, which will become apparent. This body cover assembly includes a wind screen, indicated generally by the reference numeral 13, which is affixed to and overlies a front molding or front cover 14. On each side of the motorcycle 1 below the front cover 14 there is provided a pair of combined side panels and foot rests, indicated generally by the reference numeral 15.

Below the rider's seat 8, each side of the frame is covered by a respective boomerang shaped cover, indicated generally by the reference numeral 16, called such because of its shape formed by two angularly disposed legs. Above this boomerang cover 16 at the front end of the motorcycle 1 and below the front cover 14 are a pair of left and right leg shields 17. The rear portion of the motorcycle 1 is covered by a seat underside cover, indicated generally by the reference numeral 18.

Other body components, which are shown in this group of figures, will be described only generally. The manner of attachment of those body components already described and those now to be mentioned, will be described later under the appropriate section heading of the specification. These components include a rearview mirror assembly, indicated generally by the reference numeral 21, a meter cover 22, an upper cover 23 and side covers 24. At the rear of the body, there is provided a tail cover 25, a license lamp cover 26 and a license bracket 27.

Frame Assembly (FIGS. 5 through 12, 14 and 15)

As has been noted, the previously mentioned body parts are mounted on a frame assembly little of which appears visible in FIGS. 1 through 4. The frame assembly, indicated generally by the reference numeral 28, appears in most detail in FIGS. 5 through 10 and is comprised of a head pipe 29 on which the handlebar assembly 5 is pivotally supported in a manner, which will be described later by reference primarily to FIGS. 8 through 10. This head pipe 29 has affixed to it a pair of lower frame tubes 31, each of which extends generally downwardly at a respective side of the frame assembly 28 and then curves rearwardly.

Fixed to these lower frame tubes 31 are pair of upper frame tubes 32 each of which extends generally rearwardly at the respective frame side and then bends upwardly. At the rear ends of the upper frame tubes 32 each is fixed in a box-like section 33 that is formed from a pair of plates that engage and sandwich flatten rear ends of the upper frame tubes 32.

Extending rearwardly from each of the box-like sections 33 is a respective one of a pair of rear pipes 34, which are also fixed, in sandwiched fashion between the respective box-like sections 33. A cross member 35 (FIG. 15) extends across a mid portion of the rear pipes 34 so as to provide cross bracing between them.

Brackets 36 extend downwardly and rearwardly from a mid portion of the rear pipes 34 and support the forward end of backstays 37. The backstays 37 extend rearwardly and upwardly and are affixed at the rear ends to the respective rear pipes 34.

A reinforcing frame element 38 (FIGS. 5 and 6) extends between a forward portion of the upper frame tubes 32 and intermediate portions of the lower frame tubes 31 to provide further rigidity to the structure.

The engine assembly 7 and specifically its crankcase transmission assembly 39 also functions as a part of the frame assembly. To this end, the box-like sections 33 are fixed to an upper portion of the crankcase transmission assembly 39 by fasteners 41. The lower frame tubes 31 have flattened ends and are connected by brackets 40 to a lower portion of the crankcase transmission assembly 39. In a like manner, the brackets 36 have extending portions which are also fixed to the crankcase transmission assembly 39 so as to further integrate the crankcase transmission assembly 39 into the frame assembly 28.

The connection between the handlebar assembly 5, the front forks 4 and the front wheel 2 will now be described by primary reference to FIGS. 8 through 12. The handlebar assembly 5 is connected to a crown handle 42 which, in turn, is connected to a steering shaft 43 that is journalled in the head pipe 29. A lower end of the steering shaft 43 is connected to an under bracket 44 that has a pair of outwardly extending arms that the carry the left and right front forks 4. Each of these forks 4 is comprised of tubular upper and lower parts 45 and 46 that contain a spring and shock absorber assembly for journaling the front wheel 2 for axially movement along the front forks 4 to cushion shocks as road obstacles are met.

Figure 10:
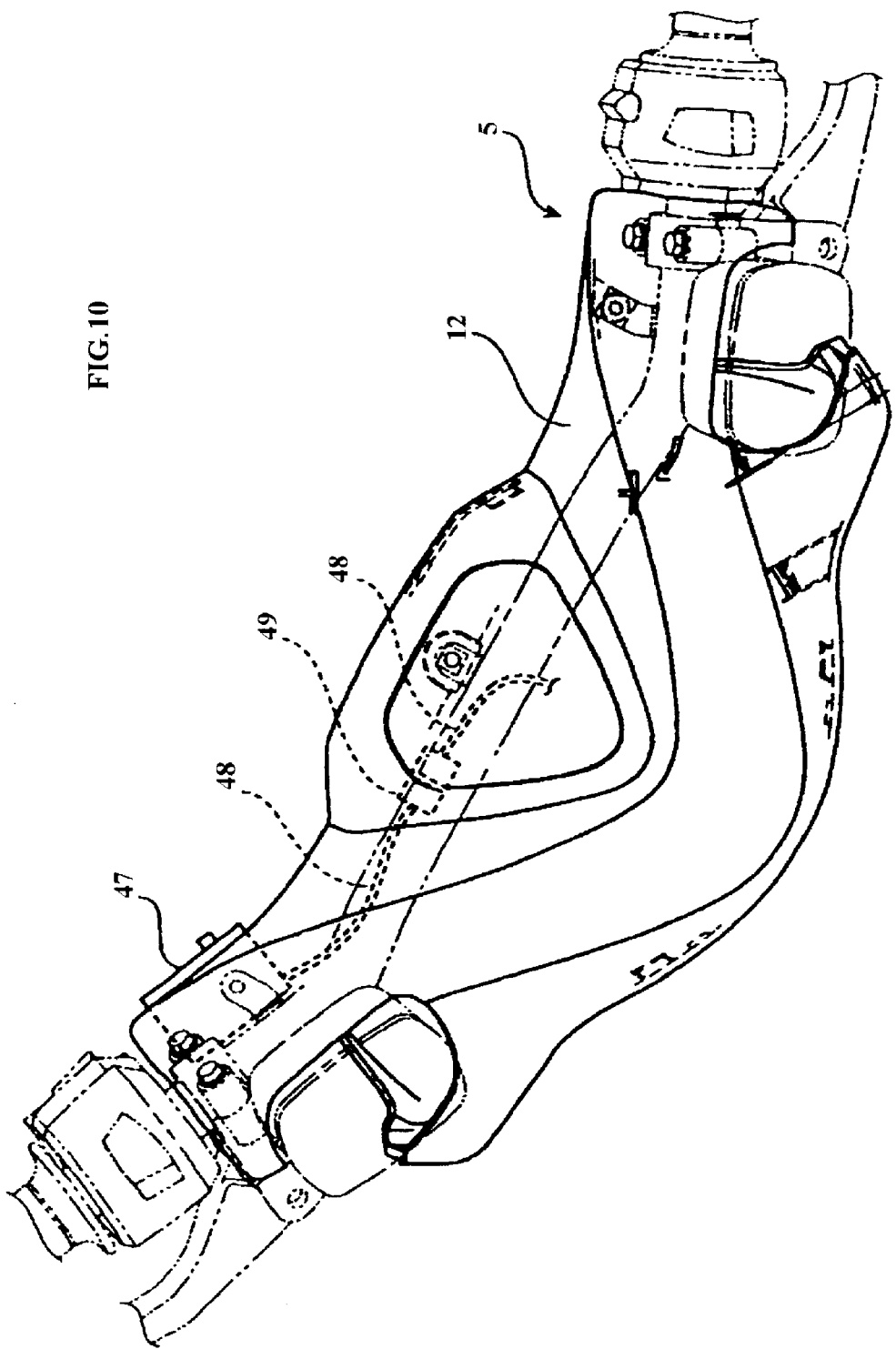
FIG. 10 is a top plan view showing the handlebar assembly and the cover associated therewith.
Figure 11:
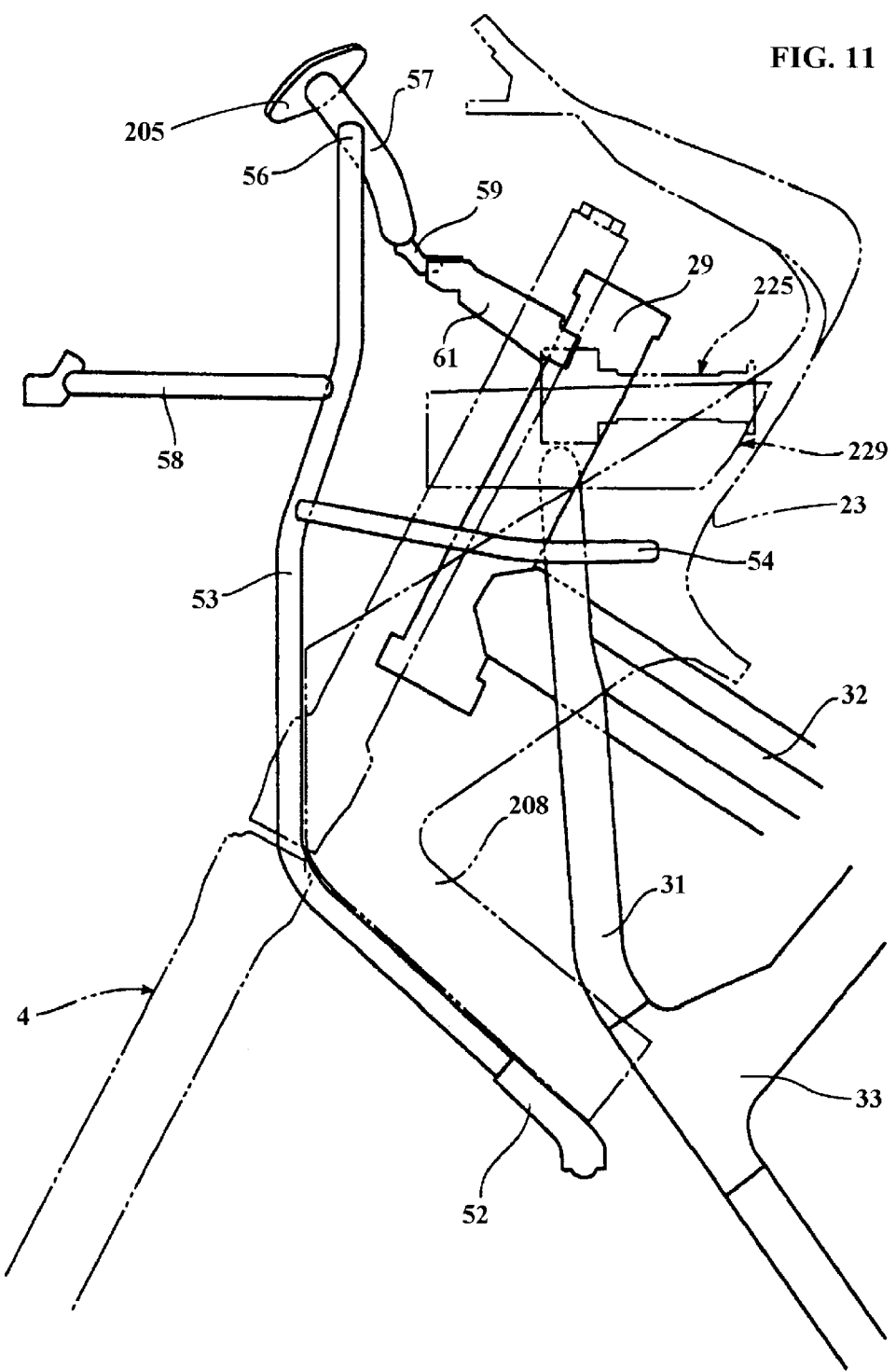
FIG. 11 is a view looking in the same direction as FIG. 8, but showing some of the frame components in phantom and auxiliary frame components in solid line.

FIG. 10 illustrates the handlebar assembly 5 and the handlebar cover 12 associated therewith. The handlebar cover 12 conceals not only the handlebar assembly 5 but also a grip warmer 47 that is supplied with electrical power through electrical conductors 48 and a coupling 49 therebetween.

A sub-frame assembly is associated with the front part of the frame assembly 28 for mounting certain of the body cover components, as will be hereinafter described. This sub-frame assembly is mounted in surrounding relation to the head pipe 29 in part on a pair of mounting brackets 51 that extend outwardly and downwardly from the lower frame tubes 31. Detachably connected thereto by means of attachment brackets 52 is a first pair of frame rails 53 that extend on opposite sides of the head pipe 29 and forwardly there beyond. A hoop like U-shaped pipe 54 is joined at its opposite ends to these frame rails 53 and is connected by an attaching bracket 55 to the head pipe 29.

The sub-frame frame rails 53 have extensions beyond their connection to the U-shaped pipe 54, indicated by the reference numeral 56, which are connected to a further hoop like frame tube 57 having a generally U-shape. A front pipe 58 is interconnected to intermediate portions of the frame rails 53 and extends in a generally horizontal direction forwardly. A mounting bracket 59 is affixed to the rear portion of the frame tube 57 and connects it via a mounting bracket 61 to the head pipe 29 so as to provide a rigid yet lightweight assembly.

Figure 9:
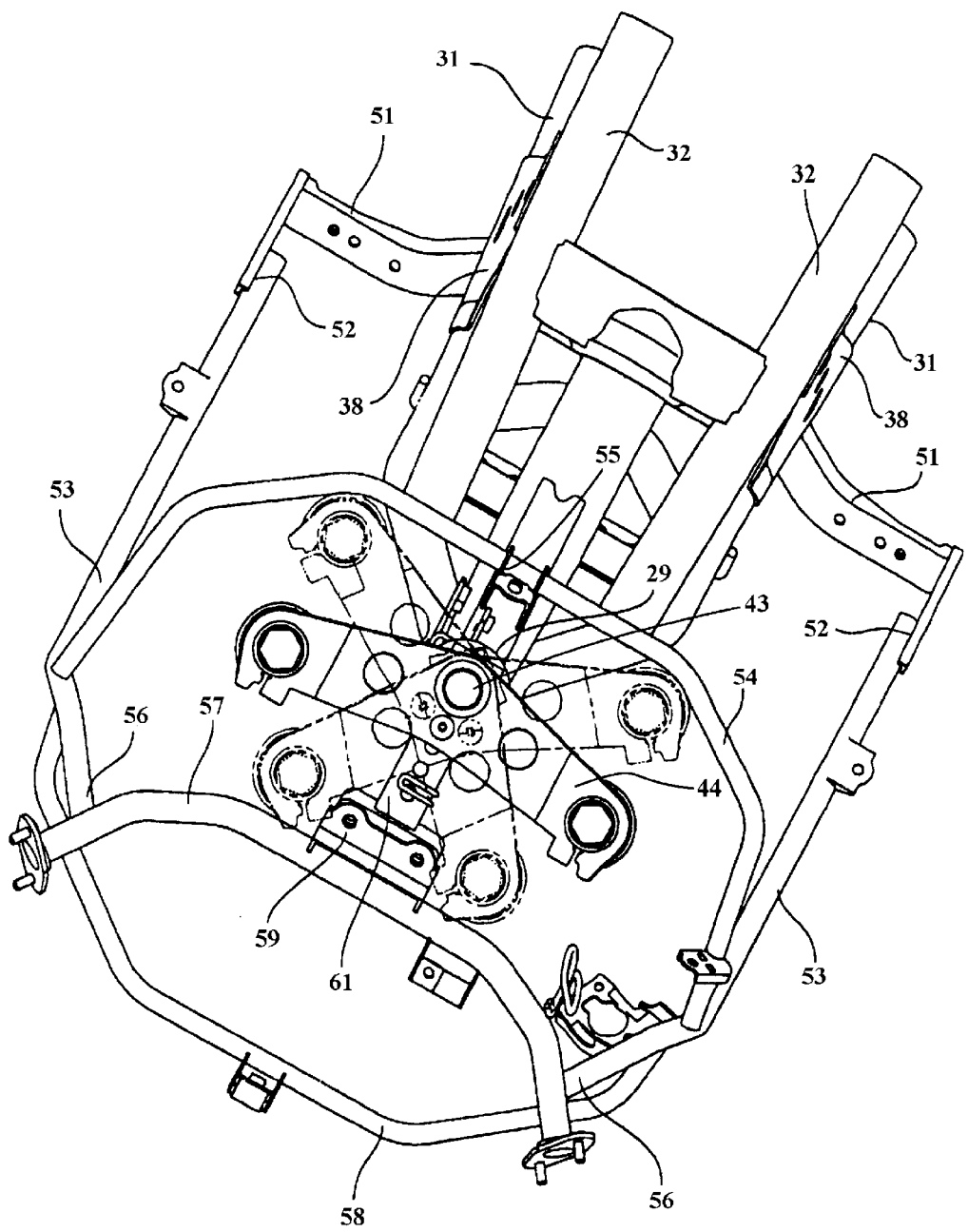
FIG. 9 is a top plan view of the structure shown in FIG. 8 and again shows primarily the structure at the front of the frame and for supporting the front wheel.

As may be seen in FIG. 9, this sub-frame construction is configured so that it does not interfere with full pivotal movement of the front forks 4 when the handlebar assembly 5 is steered to the left or to the right as seen by the phantom line portion of this figure.

Transmission, Rear Wheel Suspension and Rear Brake (FIGS. 14 & 16 through 19)

In the general overall description of FIGS. 1 through 4, it was noted that a trailing arm arrangement, indicated generally by the reference numeral 6, mounted the rear wheel 3. This trailing arm arrangement 6 will now be described by principle reference to FIGS. 14 and 16 through 19. On the non-driven side of the rear wheel, this suspension system includes a trailing arm member 62 that carries at its trailing end thereof a stationary or non-rotating axle 63 about which the rear wheel 3. The forward end of this trailing arm member 62 is journalled on a fixed pivot shaft 65 that is pivotally journalled in a forward end 66 of the trailing arm member 62 by means of a bearing 67.

This trailing arm member 62 is reinforced by outwardly extending ribs 68 so as to add to its rigidity. A bump stopper 69 is provided at an upper edge of this trailing arm member 62 that engages a fixed stop on the frame, indicated by the reference numeral 71 so a to limit the degree of upward pivotal movement of the rear wheel 3 relative to the frame assembly 28.

A final drive transmission casing, indicated generally by the reference numeral 72, provides the portion of the trailing arm assembly 6 of the driven side of the rear wheel 3. This is comprised of a secondary transmission case having an outer side 73 and an inner side 74 and which contains a flexible transmitter type transmission such as the illustrated chain type or a belt type. This transmission drives the rear wheel 3 from an output shaft 75 of a variable speed transmission that is contained within the crankcase transmission assembly 39 of the engine assembly 7 and which will be described further later.

Affixed to the end of the transmission output shaft 75 is a toothed sprocket 76 of a first reduction stage 77. A flexible toothed chain 78 is driven by the sprocket 76 and drives a larger diameter sprocket 79 that is associated with a stub shaft 81 that is journalled within the transmission case formed between the transmission casing sides 73 and 74. Affixed for rotation with this sub shaft 81 is a further toothed sprocket 82 of a second transmission stage 83. This drives a further toothed chain 84, which is enmeshed with a sprocket 85 that is journalled on the non-rotating axle 63.

This sprocket 85 is coupled by a retainer plate 86 to an end wall 87 of a hub 88 of the rear wheel 3. A non-rotatable connection is provided between the retainer plate 86 and hub 88 by means of fasteners 89 and locating pins 91. Spaced bearings 92 are carried in the hub 88 and specifically a tubular central portion thereof for journaling the hub 88 and rear wheel 3 on the non-rotating axle 63.

A removable cover 93 is affixed to the outer side of the final drive transmission casing 72 so as to provide a neat appearance and so as to access the components for servicing.

The hub 88 of the rear wheel 3 is connected to a rim 94 thereof by a plurality of spokes 95.

At the forward periphery of a tire 96 mounted on the rim 94 the trailing arm members 62 and 72 have inwardly extending projections 97 and 98, respectively. These projections are rigidly connected to each other by a threaded fasteners 99 so as to further rigidify the trailing arm arrangement 6 comprised of the trailing arm members 62 and 72.

In addition to the connections provided by the projections 97 and 98 of the trailing arm members 62 and 72, the housing portions having further extensions (FIG. 17) through which a bolt 101 passes. This bolt 101 also traps a trunion 102 of a combined shock absorber and spring element (cushioning unit) 103 and specifically the outer housing thereof. The cushioning unit 103 further has a piston rod 104 having a trunion 105 that is affixed to the engine crankcase transmission assembly 39 by a further threaded fastener 106. This cushioning unit 103 dampens the movement of the rear wheel 3 relative to the frame assembly 28.

A disc brake assembly comprised of a rotor 107 and sliding caliper, indicated generally at 108 (FIGS. 18 and 19) is associated with the rear wheel 3. The rotor 107 is affixed for rotation with the wheel hub 88 by means of a plurality of fasteners 109. The sliding caliper 108 is supported for sliding movement by a pair of support pins 111 relative to the rotor 107. These support pins 111 are connected to or carried by an extension 112 of the outer member 73 of the final drive transmission casing 72. As may be seen in FIG. 18, this places the caliper 108 axially outwardly of the wheel rim 94. Thus the brake pads may easily be replaced by removing one of the pins 111 and pivoting the caliper about the remaining pin 111 to expose the pads. This also permits the use of a large diameter for the brake rotor 107.

The rear wheel 3 also may be provided with an anti-lock braking system. This includes a detector 113 (FIG. 16) that is mounted on a mounting plate 114. The mounting plate 114 closes an opening in the wheel hub 88 and is held against rotation relative to the trailing arm arrangement 6 by means of a locating pin 100. The detector 113 cooperates with a toothed wheel 110 carried by the wheel hub 88 so as to provide a rotational speed signal for the anti-lock braking system.

Kickstand (FIGS. 20 through 23)

The motorcycle 1 is provided with a kickstand, indicated generally by the reference numeral 115 that is supported for pivotal movement on opposite sides of the engine crankcase transmission assembly 39 be means of U-shaped brackets 116. These brackets 116 carry pivot pins 17 upon which vertically extending legs 118 of the kick stand 115 are pivotally connected. The brackets 116 are affixed to the opposite sides of the crankcase transmission assembly 39 by means of threaded fasteners 119. The legs 18 have lower portions 121 that are adapted to engage the ground when the kick stand 115 is in its operative position as shown in solid lines in FIG. 20.

One of the legs 118 have affixed to it a kick leg 122 that has a foot pad 123 that is adapted to be engaged by the operator so as to pivot it downwardly to its operative position.

A coil compression spring 120 (FIGS. 1 & 5) at one side of the motorcycle 1 is engaged with one of the legs 118 to urge the kick stand 115 upwardly when tripped beyond their over center position by the operator putting his foot under the kick leg 122.

In this position, a roller stopper 124 (FIG. 20) carried by the brackets 116 will come into contact with the legs 118 so as to limit their retracted movement. Rather than being carried by the brackets 116, the stopper 124 may be carried by the legs 118 and engage the brackets 116 to stop the upward movement.

In addition to this stopper 124, the main stand is provided with a further stopper 125 that is adapted to be positioned in proximity to the final drive transmission casing 72 when in its retracted position. This stopper 125 will be contacted by the final drive transmission casing 72 and limit the downward movement of the suspension system so as to provide some further protection for the cushioning unit 103 and preventing engagement between the final drive transmission casing 72 and the kick stand 115.

Because of this position, the legs 118 can be placed further back on the motorcycle 1 and permit a larger bank angle to be achieved since they will be positioned in close proximity to the sides of the rear wheel 3. Thus, by using the two stoppers 124 and 125 rather than a single stopper, the amount of wear on the stopper is reduced as well as eliminating unnecessary bottoming of the suspension.

Figure 22:
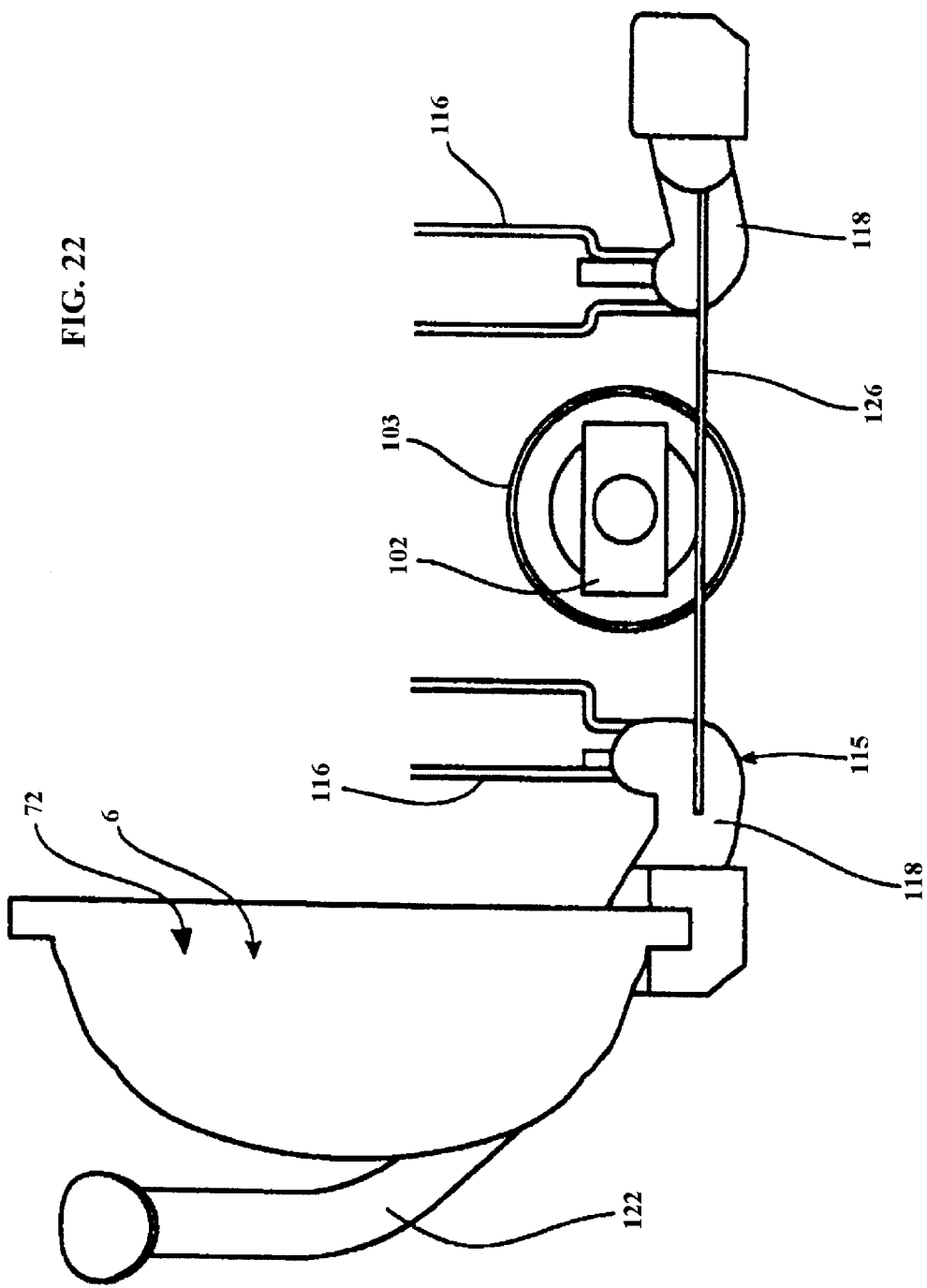
FIG. 22 is a rear elevational view showing the kickstand in the position shown in phantom in FIG. 20 and in solid lines in FIG. 21.
Figure 23:
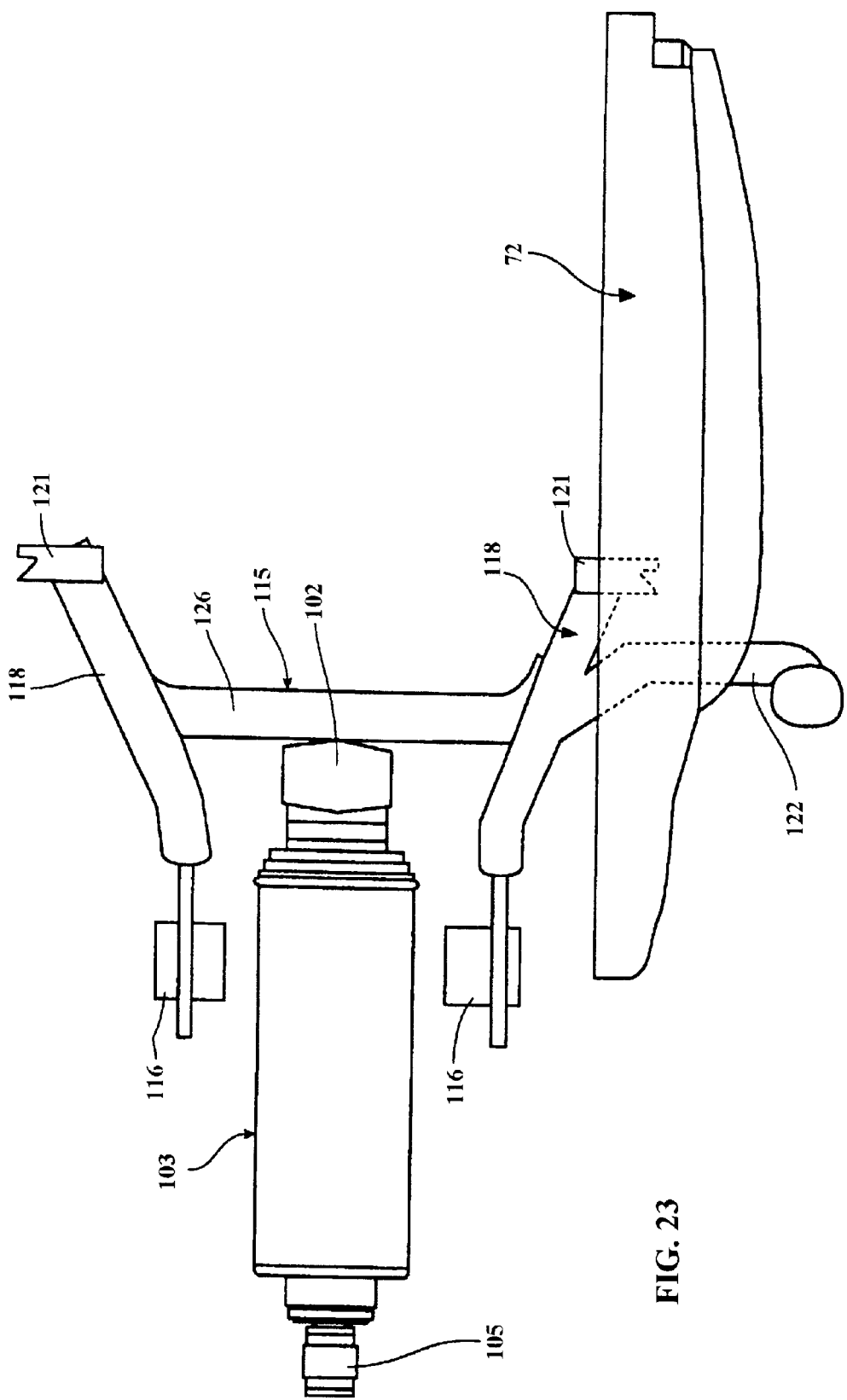
FIG. 23 is a view taken from above and showing the kickstand in its retracted position relative to the cushioning element and a portion of one side of the trailing arm.
Figures 25, 26:
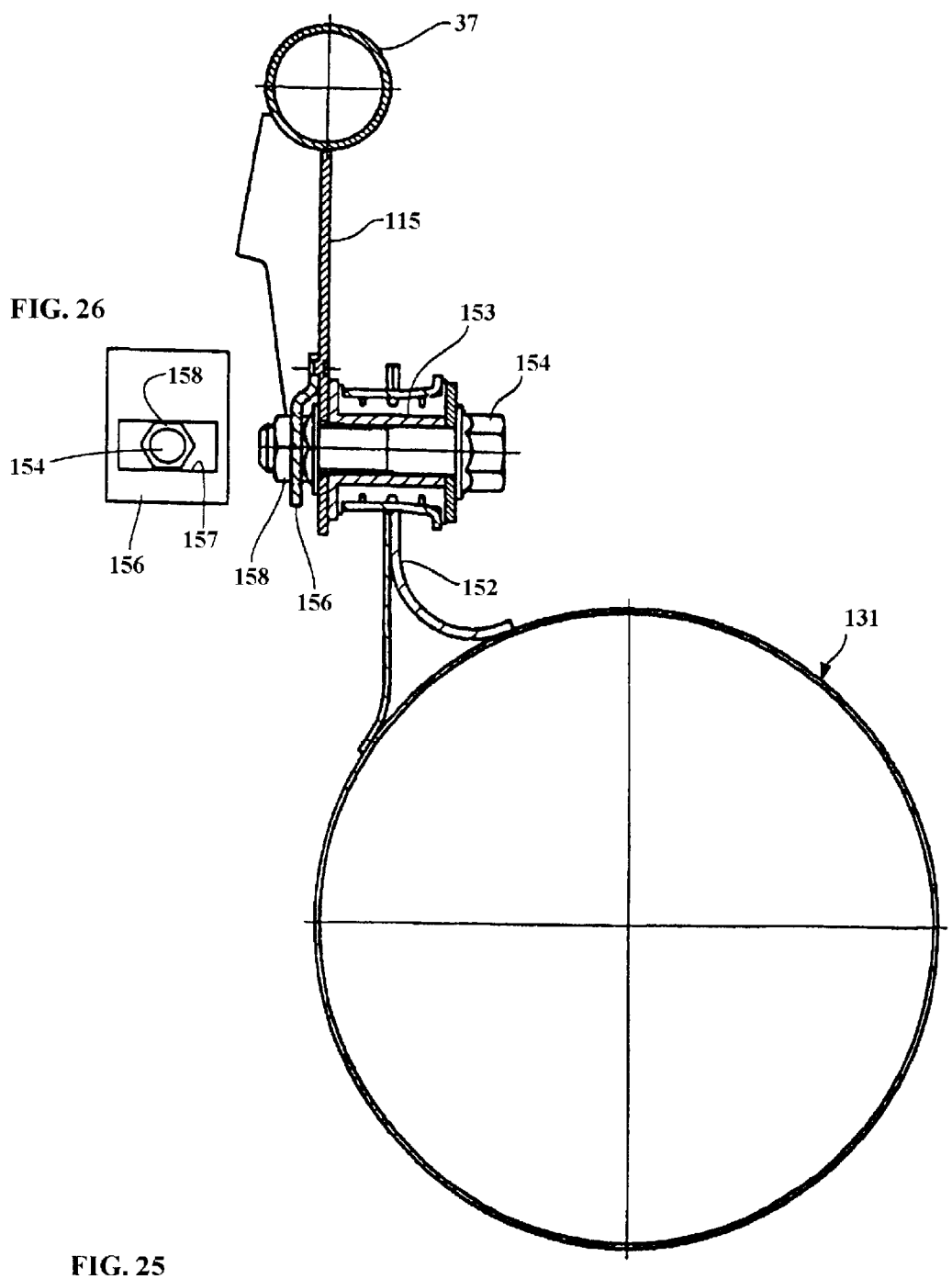
FIG. 25 is a cross-sectional view taken along a plane perpendicular to the plane of FIG. 24.
FIG. 26 is a side elevational view taken perpendicular to FIG. 25 and showing the retainer for the muffler-attaching nut.

Finally, the legs 118 are interconnected with each other by means of a cross brace 126 as been seen in FIG. 22. As also may be seen in FIGS. 22 and 23, although the components are close to each other, the kick stand 115 does not interfere with the trailing arm arrangement 6 and the cushioning unit 103. In fact the retracted kick stand 115 further protects the cushioning unit 103 from damage.

Figure 16:
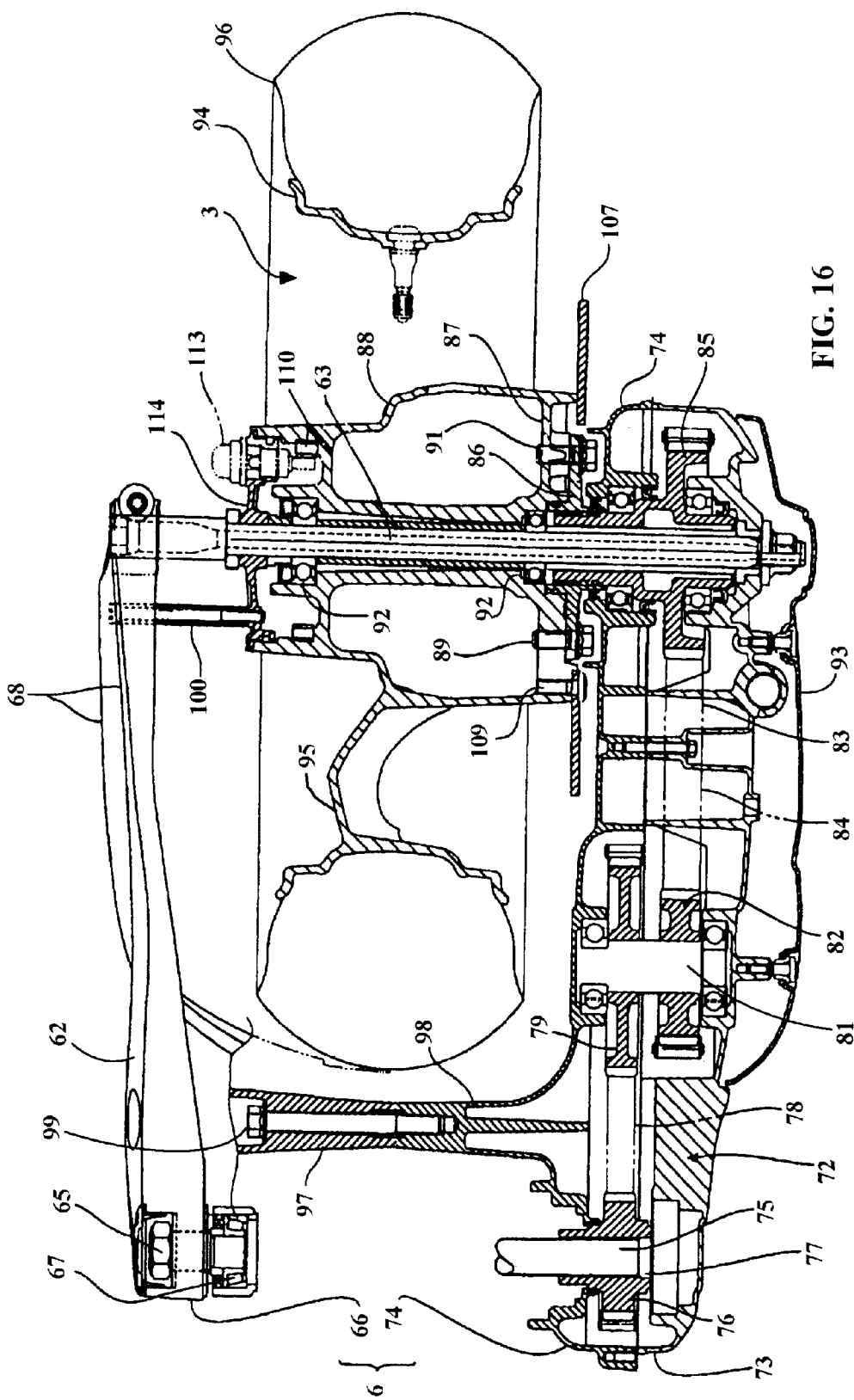
FIG. 16 is a view showing the transmission of power to the rear wheel and its suspension system with portions broken away and shown in section.
Figure 17:
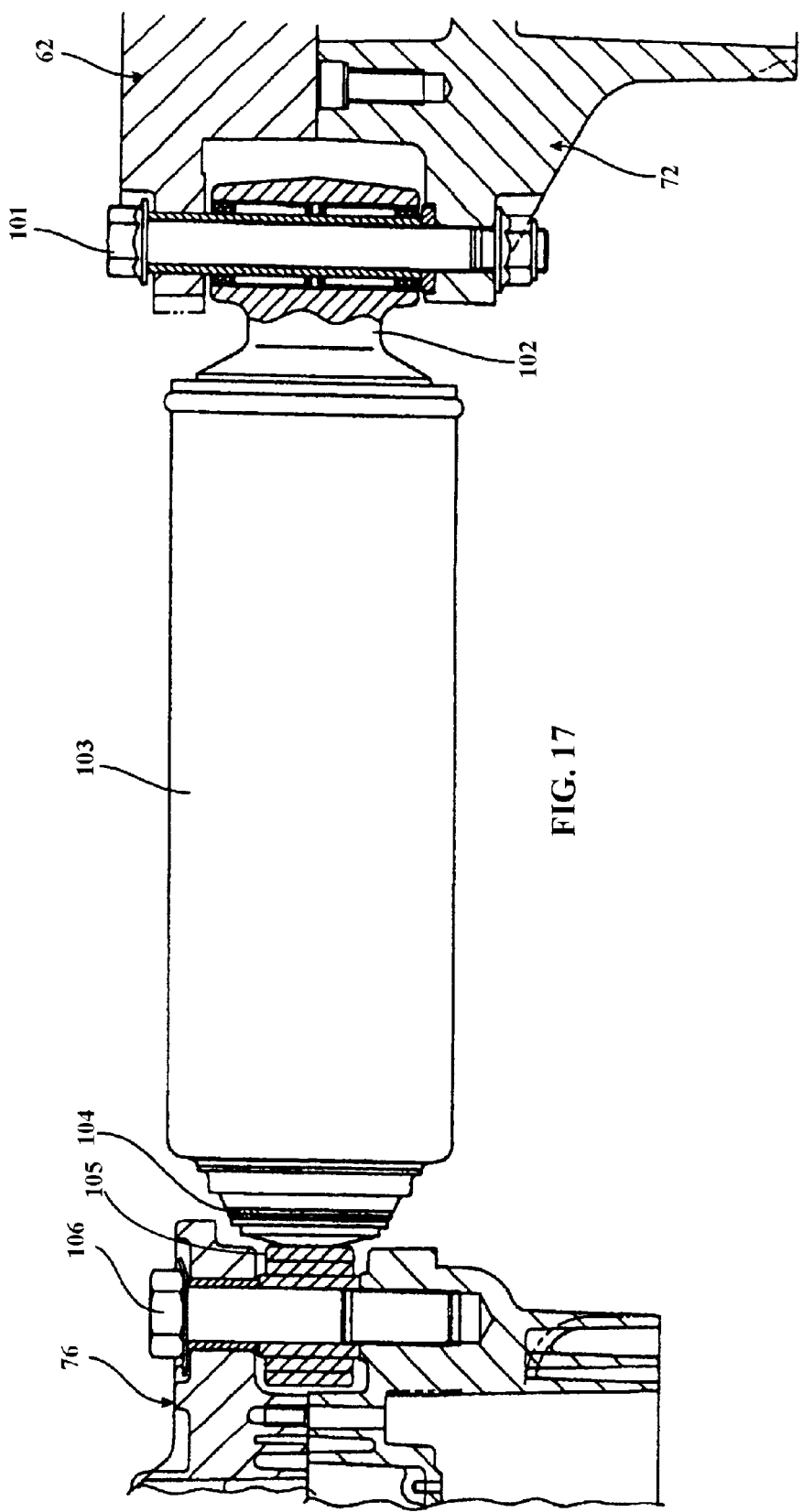
FIG. 17 is a top plan view of the cushioning element with portions broken away to more clearly show its construction.

As may be best seen in FIG. 16, the first transmission reduction stage 77 is disposed transversely inwardly of the second stage 83. This permits the kick stand 115 to be narrower in the area beneath the rider's feet and leaves more room for the kick stand 115 in both its lower and upward position. This also permits the kick leg 122 to be positioned further rearwardly and outside of the transmission case, thus permitting a wider banking angle when cornering because of the lack of interference with the ground. Furthermore, the underside of the transmission case comprised of the transmission casing sides 73 and 74 is formed within an upwardly inclined lower edge 127 (FIG. 14) which cooperates with a corresponding relieved area 128 of the trailing arm member 62 so as to provide this clearance for the kick stand 115 particularly when in its retracted position.

Also, the lateral outer spacing of the second transmission stage 83 away from the rear wheel hub 88 affords greater space for the positioning of the brake rotor 107 of the disk brake assembly.

Figure 14:
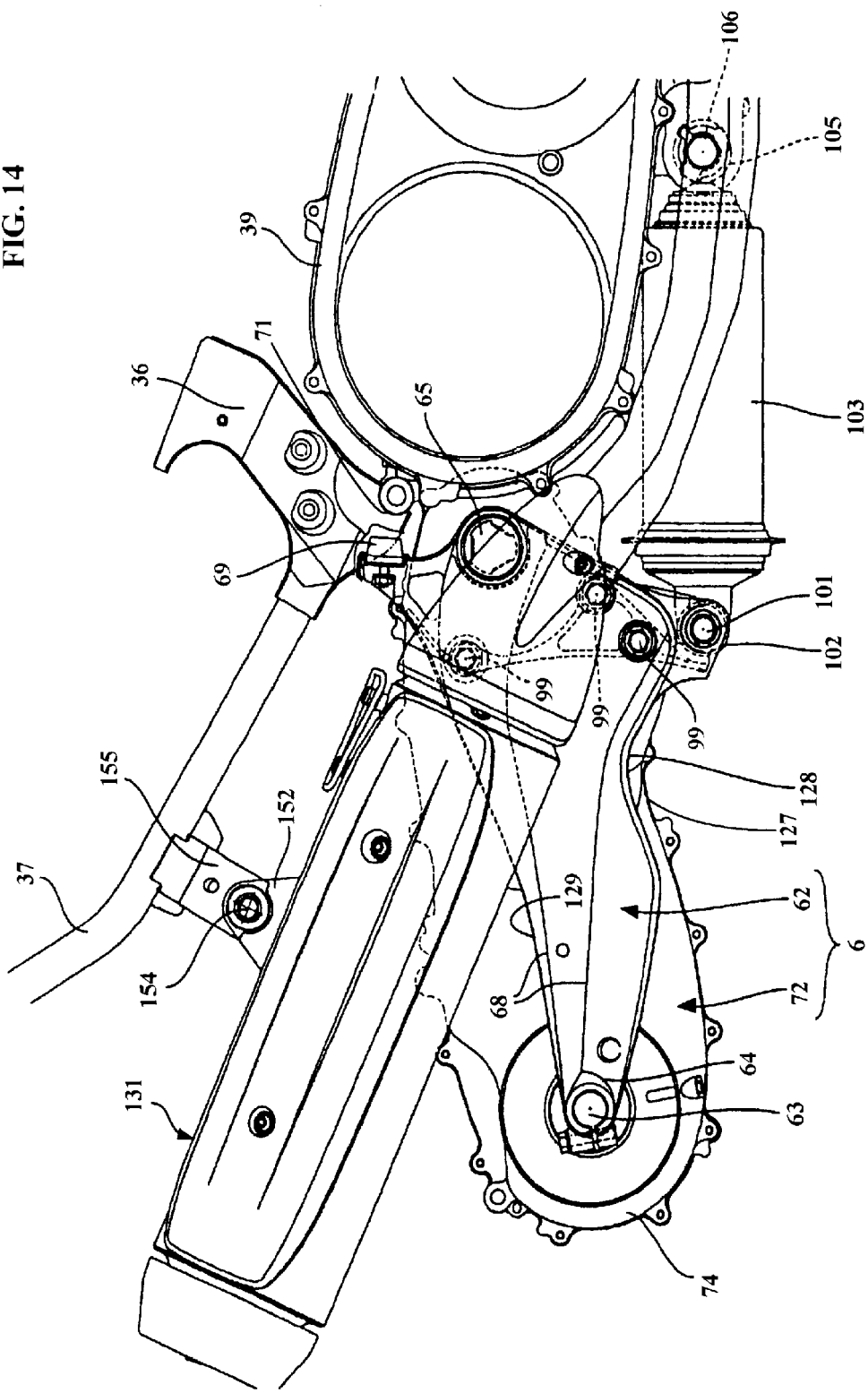
FIG. 14 is an enlarged side elevational view, of the frame structure and looking in the same direction as FIG. 4.
Figure 15:
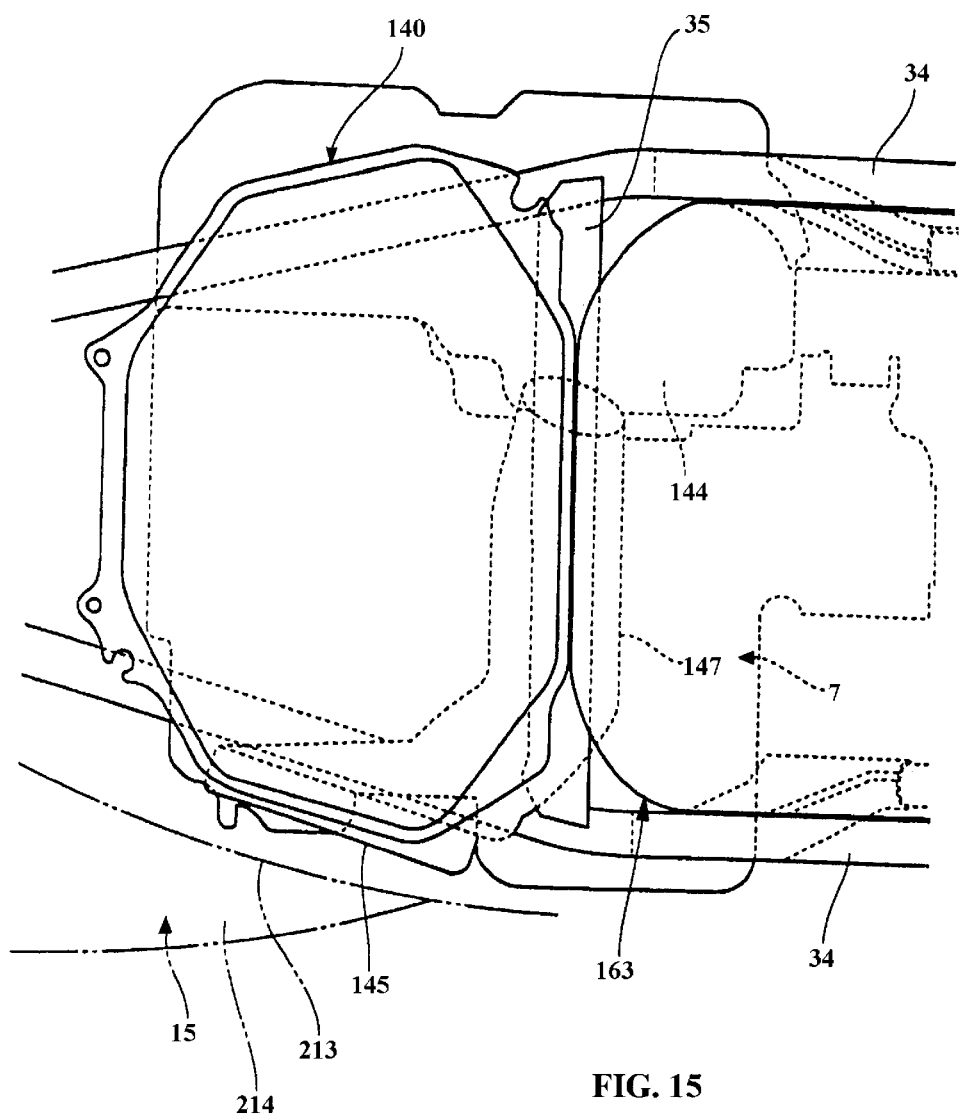
FIG. 15 is a top plan view of the rear part of the frame assembly and showing the storage box arrangement associated therewith.

As also seen in FIG. 14, the upper peripheral edge 129 of the trailing arm member 62 is inclined downwardly so as to provide clearance for a muffler, indicated generally by the reference numeral 131 and which will be described shortly without interference from the suspension movement of the rear wheel 3. This arrangement also facilitates the positioning of the components for servicing without removal of unnecessary components for replacement of components, such as the muffler 131.

The outward positioning of the upper peripheral edge 129 and a corresponding surface on the trailing arm member 62 function as a mud shield protecting the rear seat portion 11.

The connection between the transmission casing outer sides 73 and 74 preferably is such so as to contain lubricating oil in the event silent chains rather than a belt drives are provided in the final drive transmission casing 72.

Other relationships between the Engine Assembly 7 and the Frame Assembly 28 (FIGS. 4 through 7, 14, 24 through 26)

The engine assembly 7 in the illustrated embodiment of it the four-cycle, in-line, water-cooled type and is mounted so that the cylinder block extends generally horizontally forwardly of a crankshaft 132 that rotates about a transversely extending horizontal plane. The axis of rotation of the crankshaft 132 is located approximately at the mid-point between the centers of rotation of the front and rear wheels 2 and 3.

Figure 5:
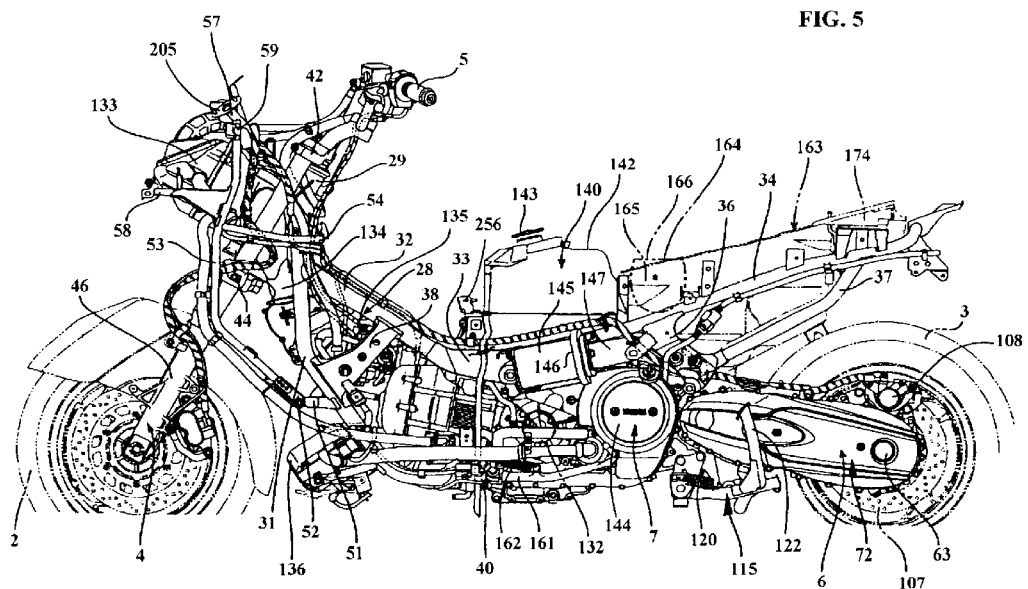
FIG. 5 is a view looking in the same direction as FIG. 1 but with all of the body components removed so as to more clearly show the frame construction and the arrangement of the running gear.
Figure 6:
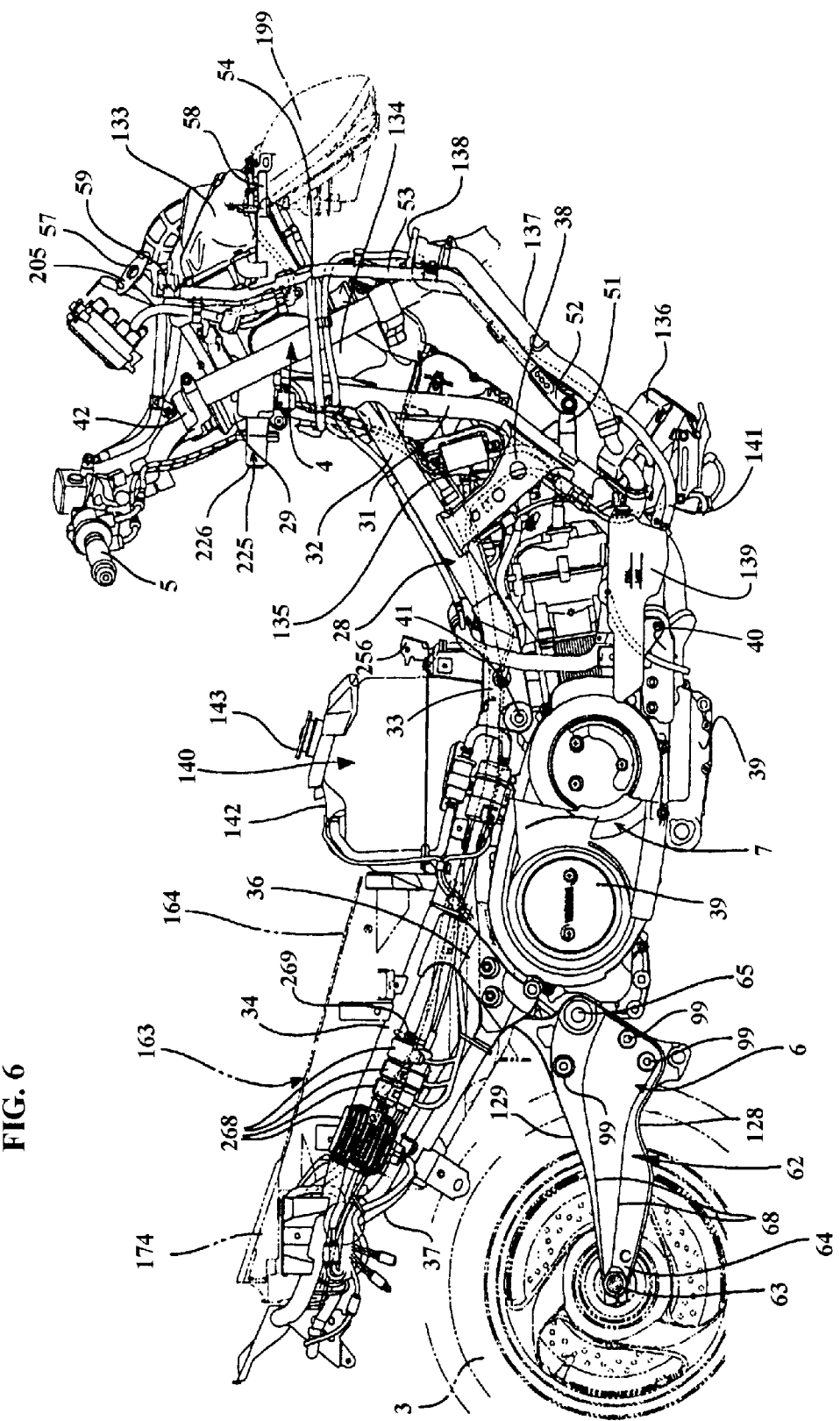
FIG. 6 is a partial side elevational view of the structure shown in FIG. 5 but looking in the opposite direction.

Referring now specifically to FIGS. 5 and 6, it should be seen that an air cleaner 133 is fixed suitably to the head pipe 29 and draws air from the atmosphere through inlet openings formed in the body cover to be described later. The air cleaner 133 delivers air rearwardly and downwardly through an intake duct 134 to a carburetor 135 which, in turn, delivers a fuel/air mixture to the combustion chambers of the engine through a suitable induction system.

The air cleaner 133 and intake duct 134 are sized and configured so as to not interfere with the front fork 4 when it is steered through its range of movement as shown through the phantom line views in FIG. 9. The intake duct 134 also passes through a center tunnel of the body cover, which will be described later.

As has been noted, the engine assembly 7 is water-cooled and to this end a radiator 136 (continuing to refer primarily to FIGS. 5 and 6) is mounted low in the frame assembly 28 and is suspended by the lower frame tubes 31. Air is delivered to the radiator 136 through the body cover in a manner, which will be described later. The mounting construction for the radiator 136 will also be described later.

The radiator 136 is provided with a fill pipe 137 which extends forwardly and upwardly to a filler cap 138 which is accessible in a manner also to be described later for filling of the cooling system. An expansion tank 139 is disposed in communication with the fill pipe 137 at an upper end thereof through a vent line 141.

Figure 7:
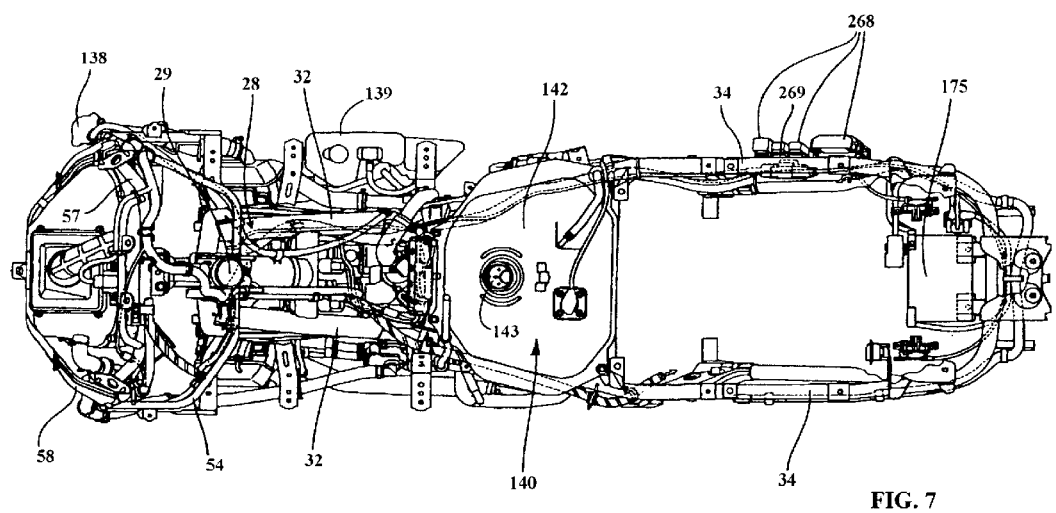
FIG. 7 is a top plan view of the frame structure shown in FIGS. 5 and 6.
Figure 8:
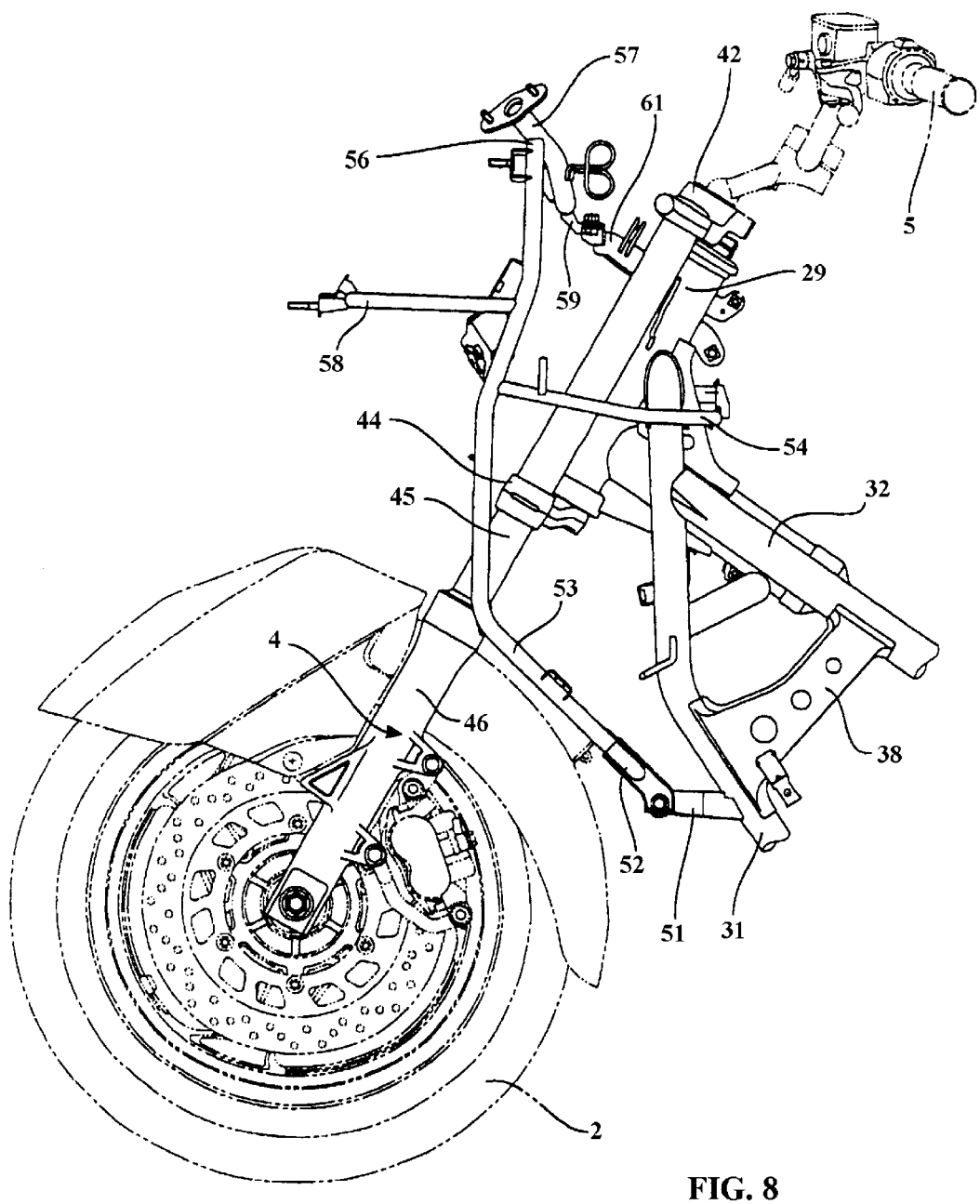
FIG. 8 is an enlarged side elevational view, looking in the same direction as FIG. 5, and showing the arrangement for supporting the front wheel.

Continuing to refer primarily to FIGS. 5 and 6 and additionally to FIG. 7, fuel is supplied to the engine assembly 7 and specifically the carburetor 135 from a fuel tank, indicated generally by the reference numeral 140, which is mounted on the frame assembly 28 above and between the upper frame tubes 32 and the box-like sections 33. The fuel tank 140 has an upper surface 142 with a filler neck on which a removable fill cap 143 is detachably connected. Fuel can be refilled in the fuel tank 140 in a manner which will be described later by reference to the body cover assembly of the motorcycle 1.

It has been noted that the secondary transmission contained within the trailing arm member 72 is driven from a variable speed transmission of the engine assembly 7. In a preferred embodiment, this variable speed transmission is provided by a CVT belt type transmission that is contained within a transmission cover indicated generally by the reference numeral 144. This transmission cover 144 is provided with a cooling air arrangement for cooling the transmission and this structure appears best in FIGS. 5, 27 and 28.

There is provided an air inlet element 145 that has an inlet opening that is encircled by a removable foam type of filter element 146. Air flows into this filter element 146 through the body cover assembly in a manner, which will be described later by reference to that body cover assembly. The air inlet element 145 communicates with a cooling duct 147 that supplies inlet air to the transmission cover 144 through a suitable opening therein.

The mounting for the muffler 131 will now be described by primary reference to FIGS. 4, 14 and 24 through 26. It will be seen that the muffler 131 has an inlet portion 148 which receives the exhaust gases from the engine assembly 7 through a pair of exhaust manifold pipes 149 and a discharge end 151 from which the exhaust gasses are discharged to the atmosphere. The outer shell of the muffler 131 has affixed to it a bracket assembly 152, which, in turn, forms a collar 153 through which a mounting bolt 154 extends.

The bolt 154 passes with an opening through a slot in a muffler mounting bracket 155 that is affixed to the frame backstay 37. A nut retainer 156 having a slotted opening 157 cooperates with a nut 158 fixed to the bolt 154 to complete the attachment of the muffler 131 to the frame assembly 28.

The non-rotating axle 63 (See FIG. 4) is located below the muffler mounting. In this way, an intermediate backstay is unnecessary so that the number of parts and time for assembly can be reduced since the muffler 131 is closer to the backstay 37. In addition, this permits the muffler 131 to be mounted at a higher location so as to be clear of the suspension unit 103. Because of the slotted opening 157 in the nut retainer 156, it will be easy to assemble these pieces so as to accommodate any longitudinal misalignment.

Figure 4:
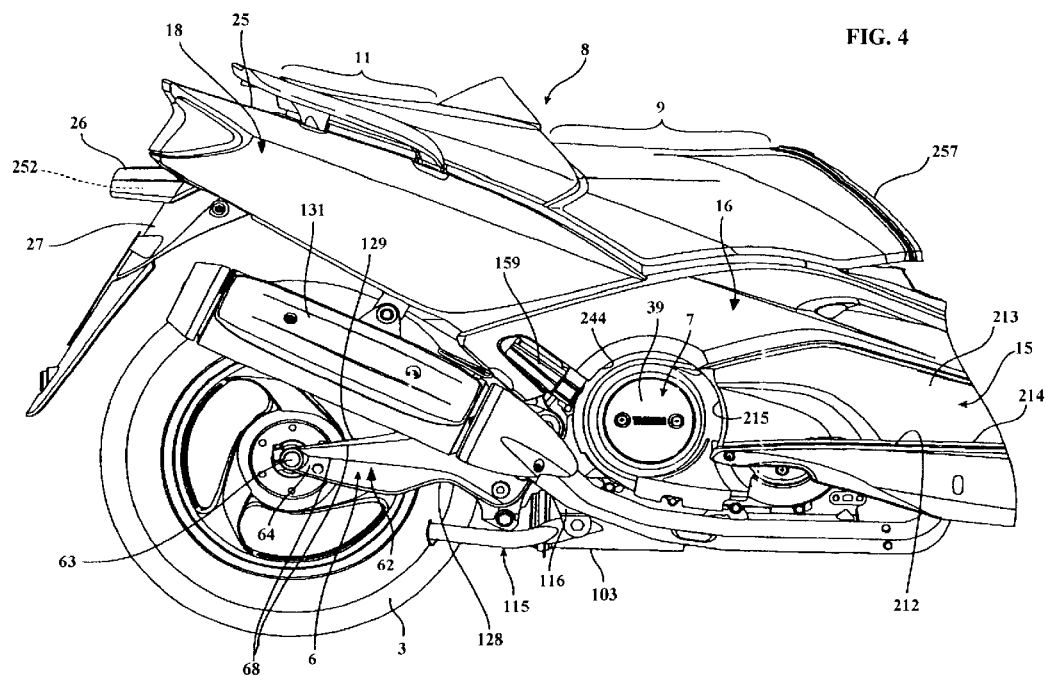
FIG. 4 is an enlarged side elevational view of the structure shown in FIG. 3 and is taken looking in the direction opposite that of FIG. 1.

As may be seen in FIGS. 1 and 4, a pair of pivoted, tandem rider foot rests 159 are provided beneath and forwardly of the passenger's seat portion 111 so that an auxiliary passenger or rider can place his feet on these foot rests 159 when they are pivoted to an extended position. In their retracted positions the rider foot rests are concealed in recesses formed in the boomerang covers 16. The tandem rider foot rests 159 are thus provided in front of the muffler 131, thereby providing a large degree of freedom of co-rider's riding posture.

As may be best seen in FIGS. 1 and 5, in addition to the kick stand 115 there is also provided a side stand 161 that is pivotally connected to the one of the frame brackets 40 and is biased to a retracted position by a coil compression spring 162.

Container Box (FIGS. 5, 6, 29 and 30)

Mounting on the frame assembly 28 and specifically on the rear pipes 34 is a container box, indicated generally by the reference 163. This container box 163 is mounted directly to the rear of the fuel tank 140 and has an open upper end 164 that is disposed generally below the upper surface 142 of the fuel tank 140. This container box open upper end 164 may be accessed by pivoting the seat assembly 8 in an upward direction, in manner, which will be described later.

A depressed forward, helmet storage section 165 of the container box 163 is adapted to receive a helmet, as indicated by the phantom lines 166. To the rear of the helmet section 165 the container box lower wall is formed with an upwardly inclined wheelhouse section 167. This section 167 is curved so as to provide a clearance for the rear wheel 3 during its full suspension travel.

It should be noted that the container box sidewalls have curved forward and rearward upper end portions 168, which extend generally downwardly and outwardly toward protruding curved lower wall ends 169 so as to provide a greater storage capacity at the bottom of the container box 163 than at its top. This permits the passenger seat portion 11 of the seat which covers the open upper end 164 to be made smaller in width and thus, improve the sitting characteristics and the passenger's foot placement without significantly interfering with the volume of the container box 163. Also, because the open upper end is smaller, sealing characteristics can be significantly improved.

The helmet storage section 165 is formed in proximity to the widest portion of the rider's seat 8 so as to accommodate the helmet 166 and the lower portion of this is also disposed in the area between the rear of the engine and the front of the front wheel so as to permit a good storage volume for receipt of the helmet 166.

At the rear of the container box 163 and on the sides of the rear wheelhouse section 167, there are provided a pair of recesses 171. These recesses 171 can accommodate elements such as a U-shaped wheel lock 172 and other tools (not shown), thus improving the utilization of space within the container box 163.

Figure 3:
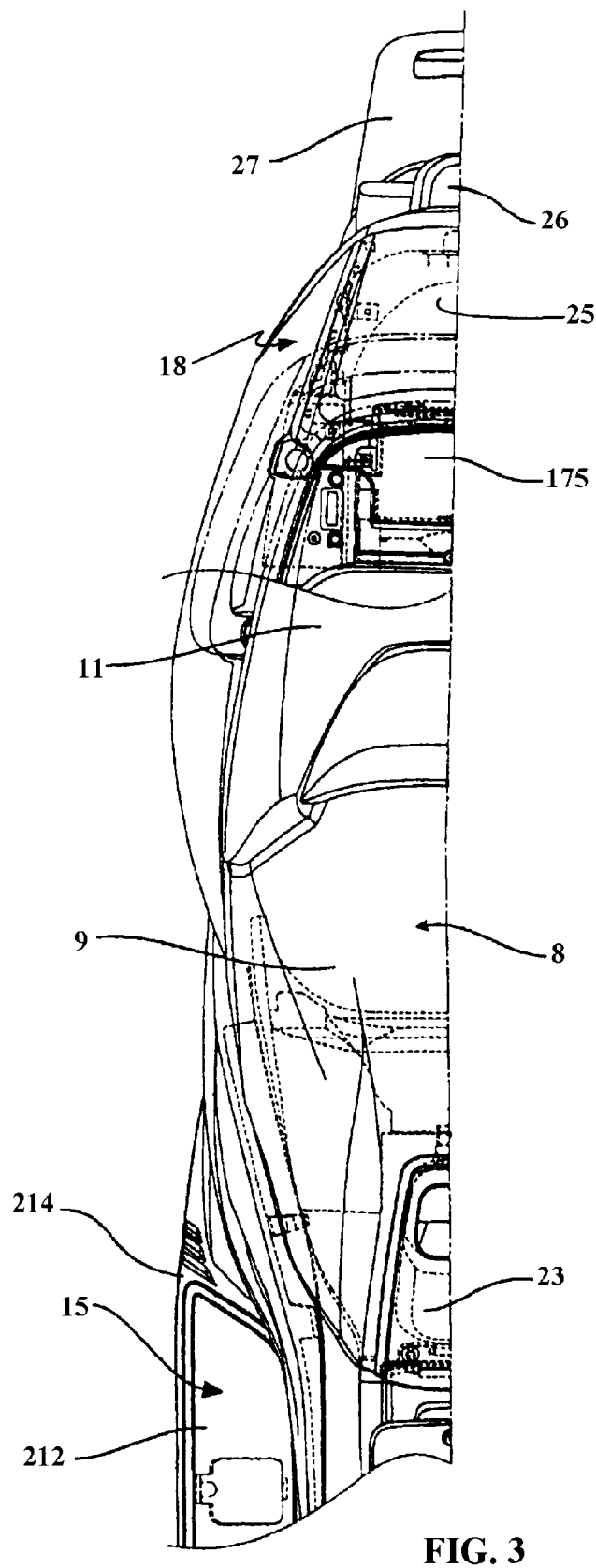
FIG. 3 is a partial top plan view of one side of the motorcycle and primarily the rear portion thereof.

Fixed to a rear wall 173 of the container box 163 and extending rearwardly there from is a battery box 174. The battery box 174 is adapted to support a battery 175 (FIGS. 3 and 7). On one side of the container box 163 and on the exterior periphery thereof, an alarm immobilizer 176 may be mounted. This side of the container box 163 is formed with a recess 170 so as to facilitate mounting of the alarm immobilizer 176 without complicating the mounting therefore.

The rear wall 173 of the container box 163 also mounts a DC outlet 177 at the opposite side from the alarm immobilizer 176. This allows electrical devices such as portable phones to be charged while contained and protected within the container box 163. The DC outlet 177 is mounted relatively low in the container box and immediately above the wheel housing recess 167.

The DC outlet 177 is disposed in a charging system for charging the battery 175 such that electric power to the outlet 177 is shut off except when the vehicle is running. This will prevent depletion of the battery.

On the opposite side of the wheel housing 167, a light bulb 178 is mounted for illuminating the interior of the container box 163 when the container box is open through the pivotal movement of the seat. This mounting of the DC outlet 177 and light bulb 178 is such that they will not interfere with articles such as storage bags 179 (FIG. 29) that may be contained within the container box 163.

By mounting the DC outlet 177 and light bulb 178 on opposite sides of the rear wheel housing 167 space utilization is improved and these components will not interfere with each other and specifically the light from the bulb 178 will not be obstructed by the DC outlet 177.

Body Cover Assembly (FIGS. 31 through 53)

As has been noted previously, those components, which make up the body cover assembly, will be described primarily by reference to the figures identified in the heading of this section. However, these components appear in many of the other figures and most notably in FIGS. 1 through 4 so those other figures may also be referred to in considering the following description.

Beginning at the front of the motorcycle 1, it has been noted that there is provided a front screen or wind screen 13 that is disposed above a front molding or front cover 14. As best in FIG. 35, the wind screen 13 is comprised of a main, primarily transparent, screen part 181, which is mounted over an inner panel 182. The inner panel 182 is provided at the upper end thereof with a pair of rearwardly facing lips 183 that cooperate with the meter cover 22 as will be hereinafter described.

A lower portion of the main screen part 181 is formed with a section, indicated generally by the boundaries 184 which are formed with a graduated print section that is intended to overlie and mate with an upper edge 185 of the inner panel 182. The inner panel 182 has a generally V-shaped configuration at its lower end and is formed there above with projections 186 that hold the wind screen 13 in spaced relationship thereto in the area of the graduated section 184. This also provides a drain area between the two so that water can be drained from this area.

A lower section 187 of the wind screen 13 below the graduated area 184 is formed with an opaque section, such as black print, so that accumulated material on the inner panel 182 will not be visible. This also conceals a drain groove 188 formed in the lower part of the inner panel 182 for draining water outwardly. This drain groove 188 is formed in a V-shaped section 189 formed at the lower part of the inner panel 182 and drains accumulated water outwardly over the head lamps to be described shortly.

It should be noted that these components overlie the air cleaner 133.

Embedded in the opposite sides of the inner panel 182 are nuts 191 (three on each side) that receive threaded fasteners 192 which pass through openings 193 in the wind screen 13 so as to secure these two components together. Preferably, the nuts 191 may be formed from an elastomeric material so as to provide a tight locking fitting between the components that cannot work free and will not corrode.

Extending portions of the inner panel 182 are formed with a plurality of fastener receiving openings 193; these permit attachment to the vehicle frame assembly 28. The relation of these body cover components 13, 181 and 182 to the frame 28 and the sub frame elements appears best in FIG. 33.

Figure 37:
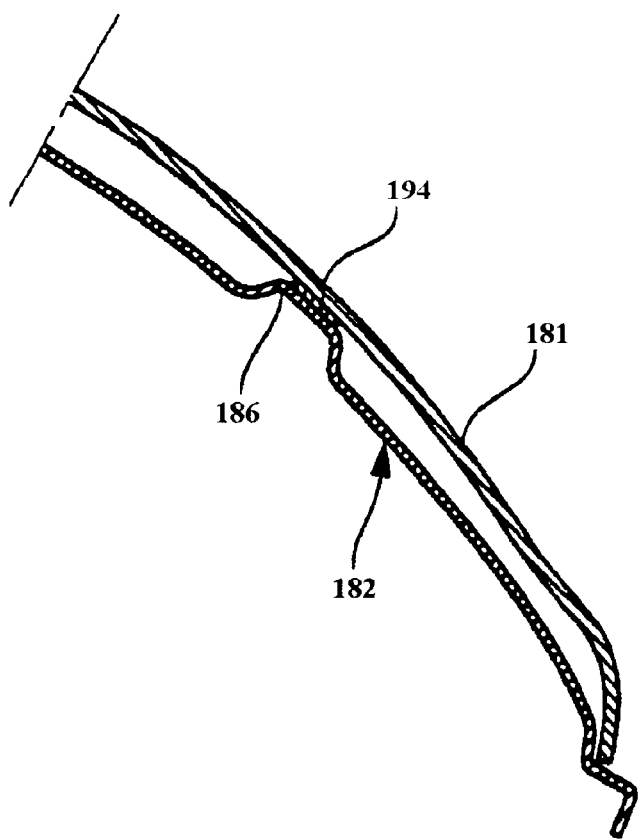
FIG. 37 is an enlarged cross sectional view taken along the line 37—37 of FIG. 35.

As may be best seen in FIG. 37, when the main screen part 181 and inner panel 182 are fixed to each other, elastomeric pads 194 are positioned between the projections 186 and the main screen part 181 so as to maintain the air gap there between.

Figure 38:
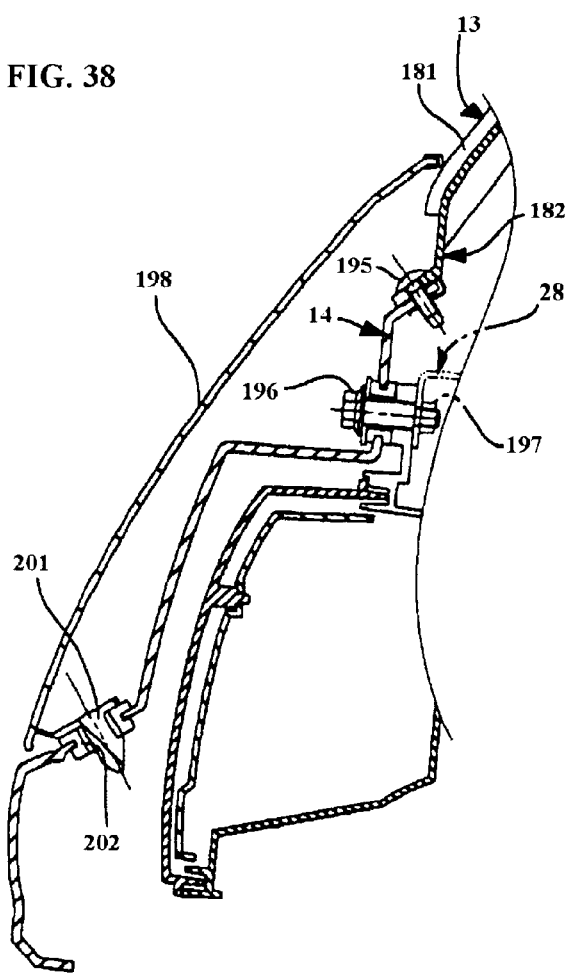
FIG. 38 is an enlarged cross sectional view taken along the line 38—38 of FIG. 31.

As seen in FIG. 38 the completed wind screen 13 is affixed to the front cover 14 by means of threaded fasteners 195. The front cover 14 is, in turn, affixed to the sub frame of the frame assembly 28 by means of threaded fasteners 196 and nuts 197. This type of attachment is formed around the periphery of the wind screen 13.

At other places, the wind screen 13 may be affixed to the sub frame of the frame 28 via stays or the like.

The front molding or front cover 14 is comprised of a planar portion 198 that extends downwardly and which surrounds a pair of headlights 199. The upper portion of this planar portion 198 covers and conceals the attaching screws 192.

Continuing to refer to FIG. 38, it should be noted that the molding 14 is also secured to the front cover 14 by means of engaging projections 201 that are snapped into retainer rings 202 carried at the lower peripheral edge of the front cover 14. Thus, from the foregoing description it should be readily apparent that a number of components can be readily accessed for servicing such as the air cleaner 134 by merely removing the screws 196 and pulling the engaging projections 201 out of the retainer rings 202. Thus, the inner panel 182 as well as the wind screen 13 can be quickly removed as a unit for servicing. The peripheral connections also permit the assembly to be quite rigid because of the leverage they obtain.

Also, the provision of the drain groove 188 in the inner panel 182 permits water to be drained out of the openings in which the headlights 199 are received. Thus, this will insure that the water can be removed without unsightliness and also the provision of the drain groove 188 adds to the rigidity of the body cover panels.

Figure 34:
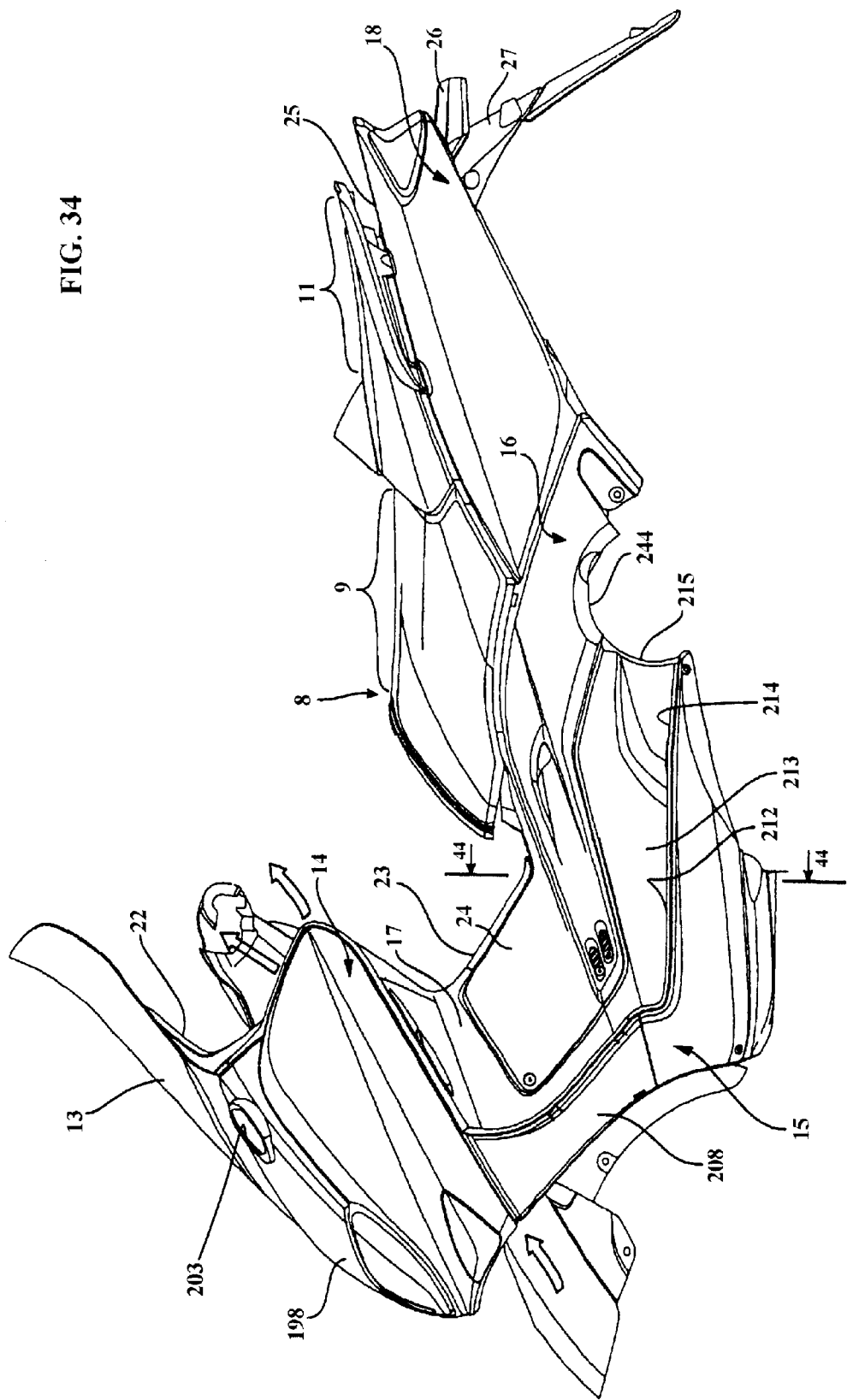
FIG. 34 is a view looking in the same direction as FIG. 33 but shows only the body cover.
Figure 35:
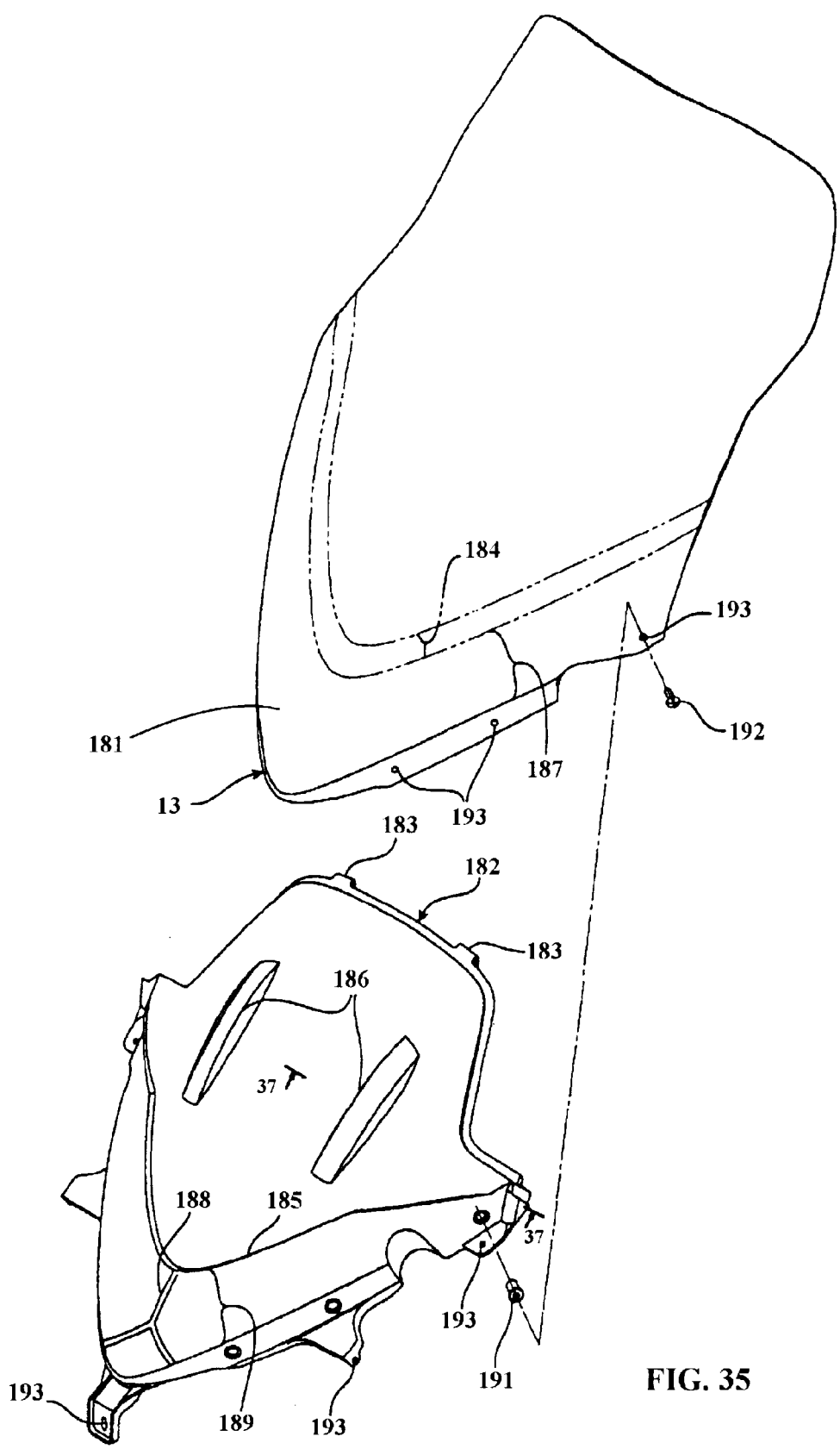
FIG. 35 is an exploded front perspective view showing the windshield and front cover.
Figure 36:
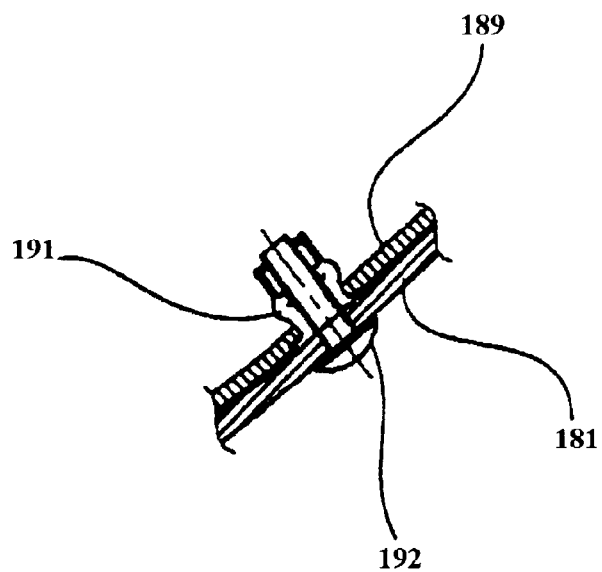
FIG. 36 is an enlarged cross sectional view taken along the line 36—36 of FIG. 31.
Figure 41:
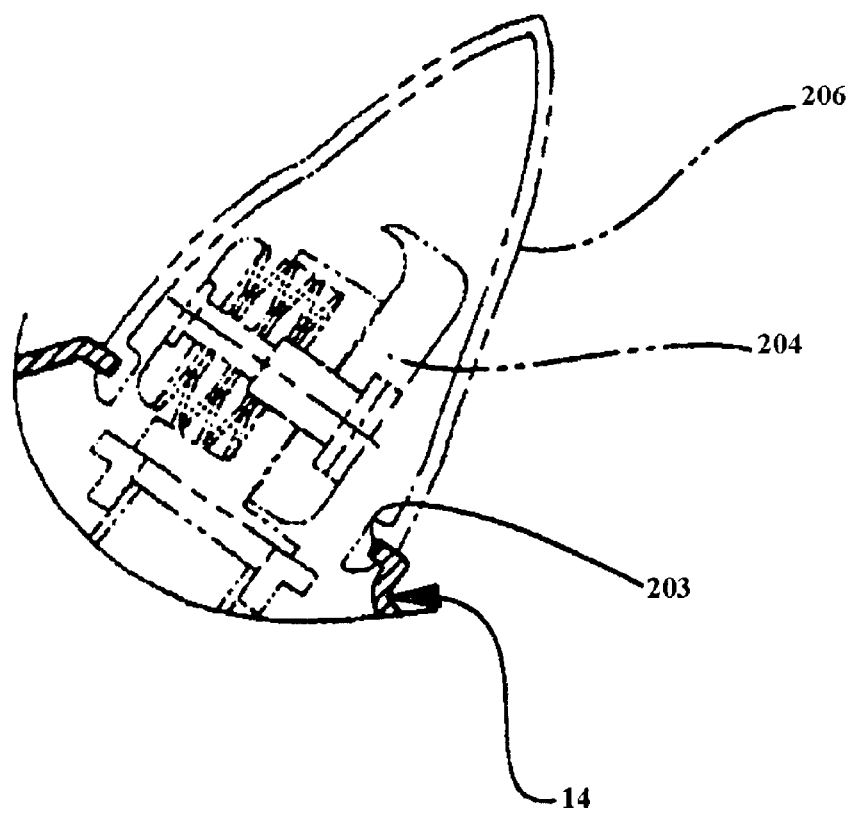
FIG. 41 is an enlarged cross sectional view taken along the line 41—41 of FIG. 33.

As best seen in FIGS. 34 and 41 the front cover 14 and specifically the upper area of the planar portion 198 is formed with a mirror opening 203. A mounting post 204 of the mirror assembly 21 passes through this mirror opening 203 and is suitably connected to the frame 28 and specifically mirror mounting brackets 205 (FIGS. 5 and 6) of the sub-frame tube 57. A flexible boot 206 surrounds the mirror mounting post 204 and provides a neat appearance and yet permits manufacturing tolerances to be accommodated between the various components.

Figure 31:
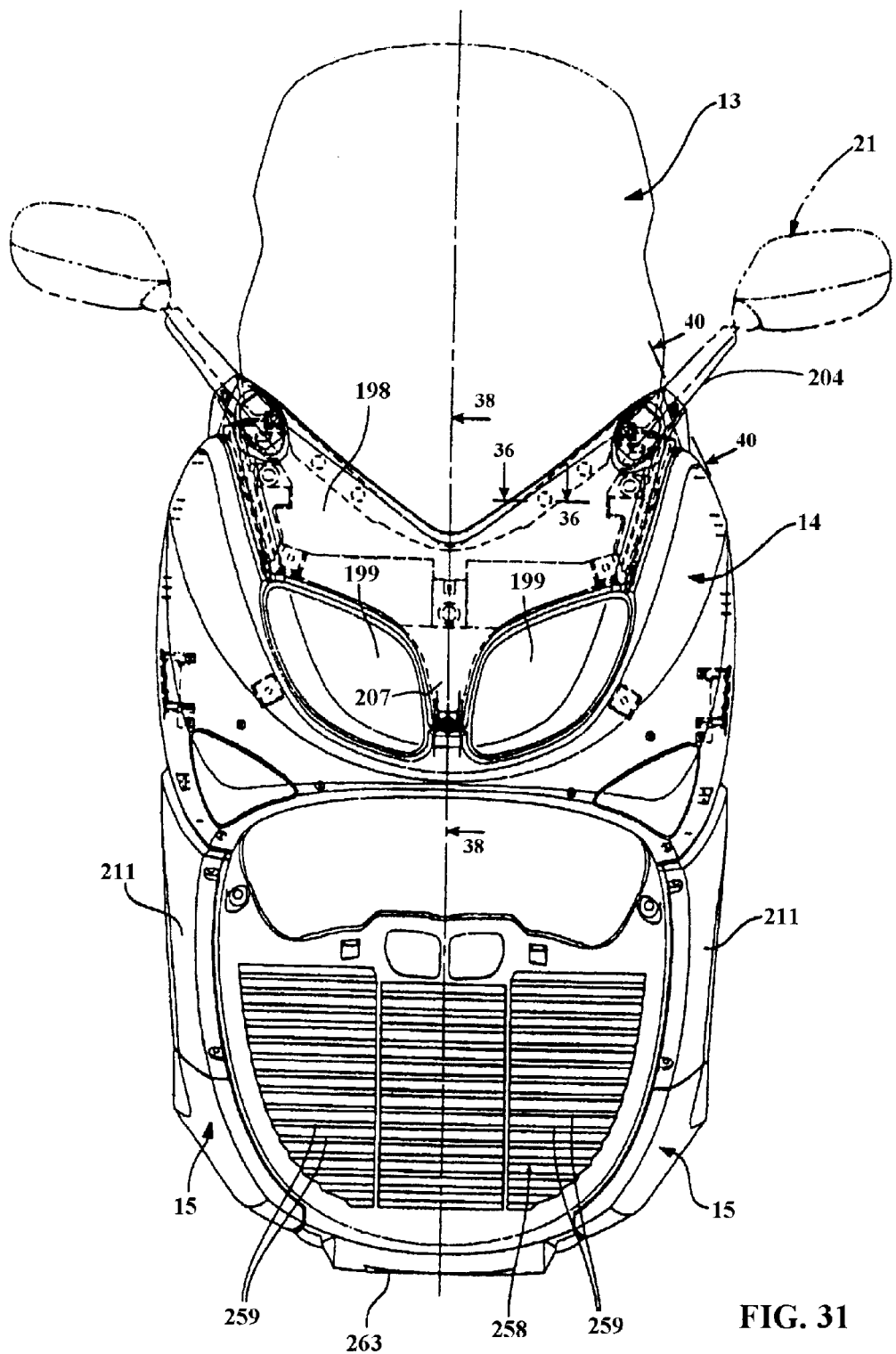
FIG. 31 is a front elevational view showing the body cover assembly at the front of the motorcycle.

Also, as best seen in FIG. 31 the lower part of the planar portion 198 has an extending section 207 that covers the area between the headlights 199. Thus by separately removing the front molding or front cover 14, it thus is possible to adjust the headlights. This also permits variation in the color scheme for the lower part of wind screen 13 and the front cover 14.

The construction of the side panels and foot rests 15 and their relationship to the other parts of the body cover assembly will now be described by principal reference to FIGS. 33, 34, 38 and 44 through 49. First, each of these side panel and foot rests 15 is comprised of an upwardly and forwardly extending part 208 which functions to provide a leg shield for the legs of the rider seated on the seat 8 and specifically the rider's portion 9 thereof. The rear portion thereof forms a foot rest 209 upon which the rider may place his feet.

Affixed suitably to the lower portion of these leg shields is a rearwardly extending part 211 which forms a foot rest surface on which a foot pad 212 may be positioned and a side panel portion 213 that extends rearwardly. A rear end portion 214 thereof also forms an area where a rider/passenger seated on the seat portion 11 may place his feet and is covered by the foot pad 212.

The rear end of this portion and specifically the foot rest side panel portion 213 thereof, is formed with an arcuate cutout 215, which clears the engine transmission assembly 7 and specifically the crankcase portion 39 thereof. Thus, the crankcase portion 39 is exposed outwardly from the side and can be cooled. Also, this eliminates the extra width that would be lost if the foot rest side panel portion 213 extending across this crankcase assembly 39. Furthermore, this affords ease of servicing. Also this permits the riders to easily place their feet on the ground when the motorcycle 1 is stationary.

Figure 40:
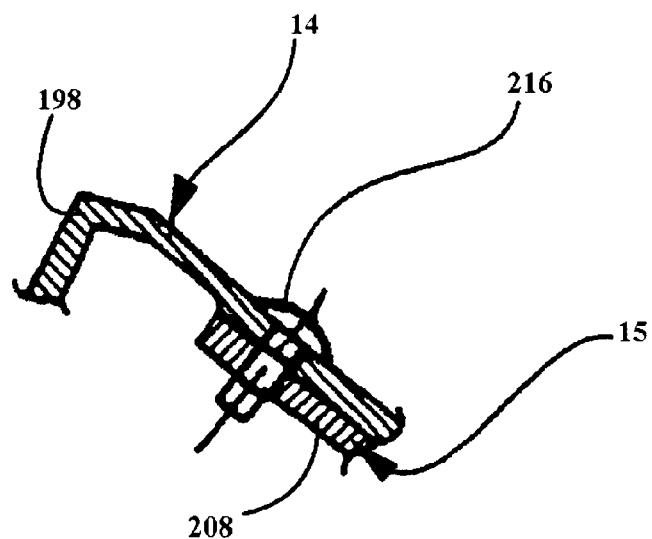
FIG. 40 is an enlarged cross sectional view taken along the line 40—40 of FIG. 31.

At its upper end, the leg shield portion 208 is connected to the planar portion 198 of the front cover 14 by threaded fasteners 216 (FIG. 40). The rear support for the foot rest portions 211 and 214 will be described later.

Figure 39:
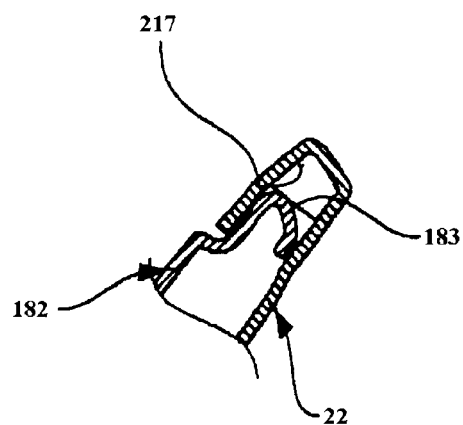
FIG. 39 is an enlarged cross sectional view taken along the line 39—39 of FIG. 32.

It has been previously noted that the wind screen 13 and specifically the inner panel 182 was formed with rearwardly facing lips 183. As seen in FIG. 39, these rearwardly facing lips 183 are received in a groove 217 formed by the meter cover 22.

Figure 32:
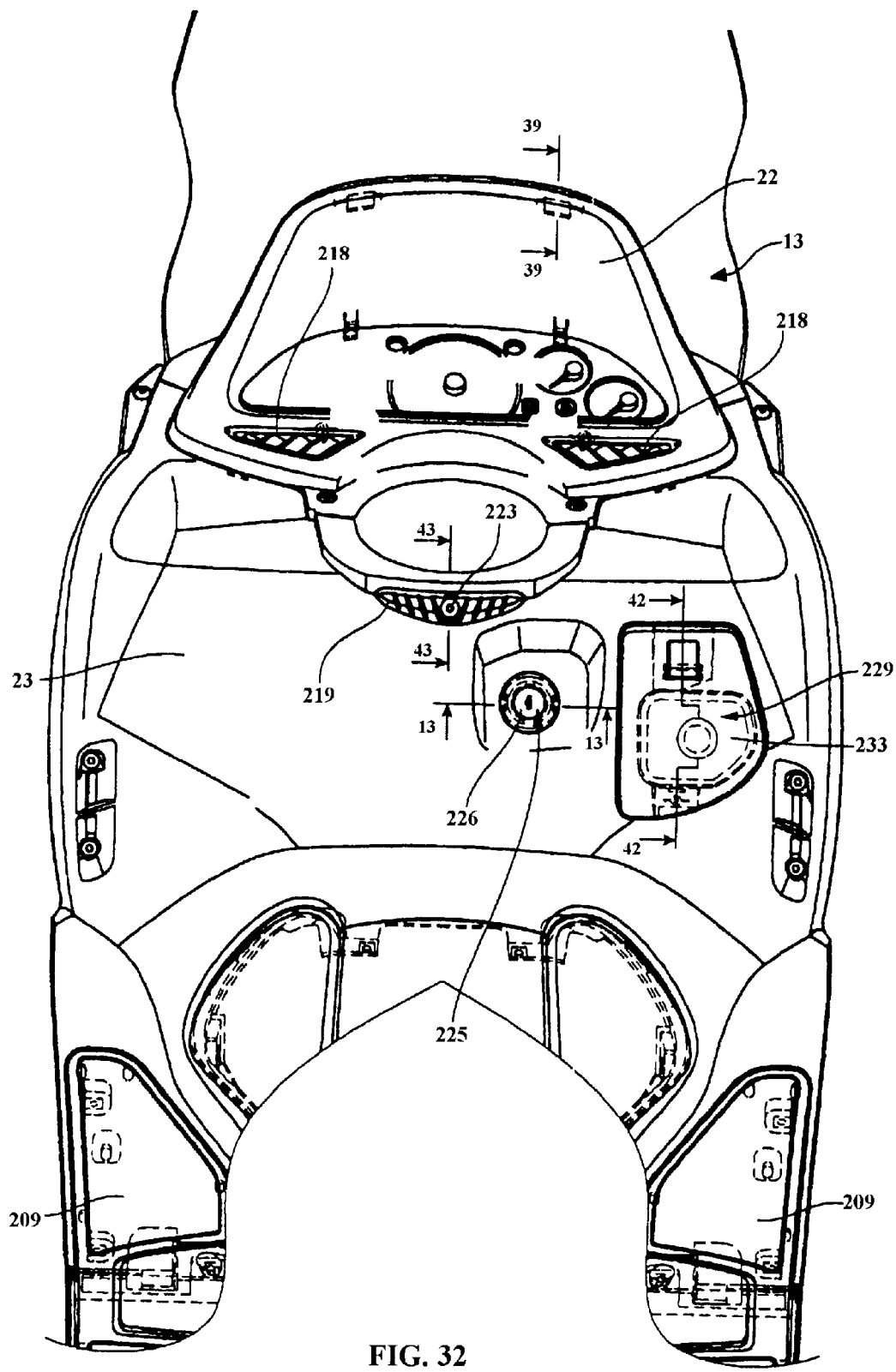
FIG. 32 is a rear elevational view showing the rear part of the front body cover and specifically the upper cover and meter cover.

The meter cover 22 has a transparent section through which gauges may be seen as seen in FIG. 32. Below them, there are provided air outlet ducts 218 which permit air to be exhausted or drawn in depending upon the running condition.

Figure 43:
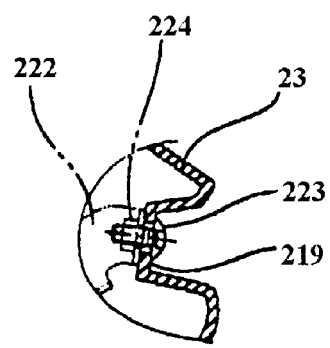
FIG. 43 is an enlarged cross sectional view taken along the line 43—43 of FIG. 32.

Below the meter cover 22, and in front of the rider's seat 8 is the upper cover 23. The upper cover 23 also has an air inlet or outlet duct 219 and is connected to a frame stay 222 by a threaded fastener 223 and nut 224 (FIG. 43). The frame stay 222 may be suitably fixed to any portion of the frame assembly 28. Since this connection is formed at the center of the air duct 219 the number of recesses and holes in the surface of the upper cover 23 can be decreased improving the external appearance. When the motorcycle 1 is running, air will flow as shown by the arrows in FIG. 34 and exit through the air ducts 218 and 219 to balance the pressure on opposite sides of the wind screen 13 and prevent negative pressure inside the wind screen 13 can be prevented, avoiding wind noises and turbulent wind flow.

Figure 12:
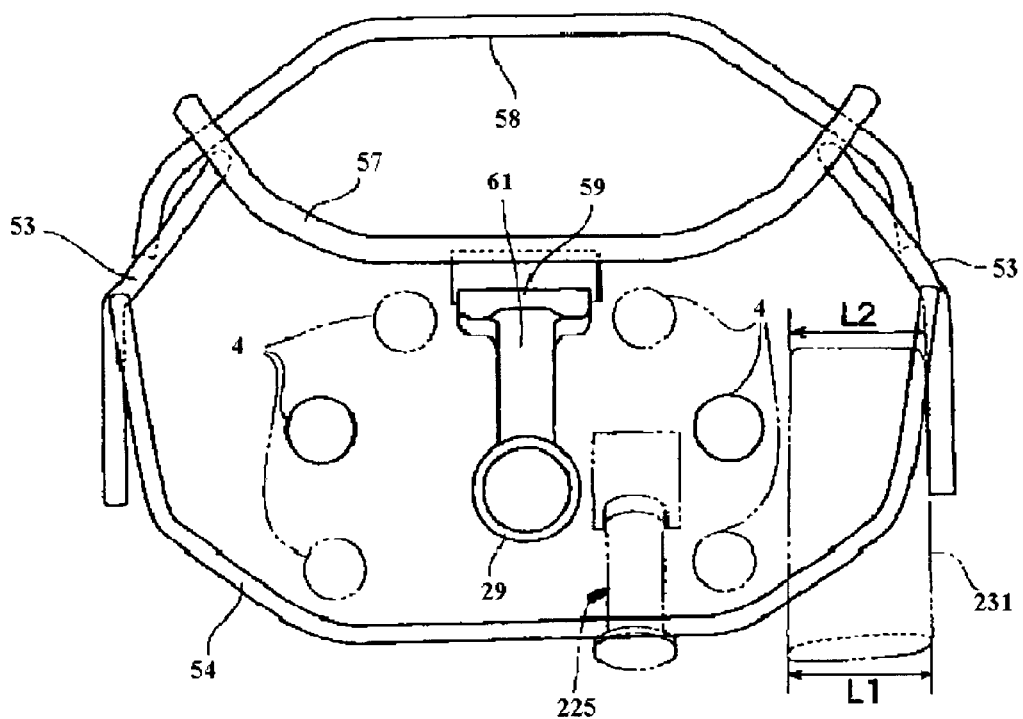
FIG. 12 is a top plan view, in part similar to FIG. 9, but shows primarily the frame components.
Figure 13:
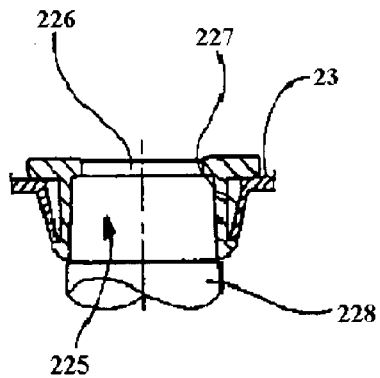
FIG. 13 is a cross sectional view of the main switch taken along the line 13—13 of FIG. 32.

A main switch, indicated generally by the reference numeral 225 is mounted to the portion of the cover 23 and is carried by the frame assembly as best seen in FIGS. 12, 13 and 32. This main switch 225 is disposed between the front forks 4 and is positioned so that it will not interfere with their steering movement through the range shown in FIGS. 9 and 12. This main switch 225 has a key-receiving portion 226 that extends through an opening 227 formed in the upper cover 23. The body 228 of the main switch 225 is basically concealed within this upper cover 23.

Figure 42:
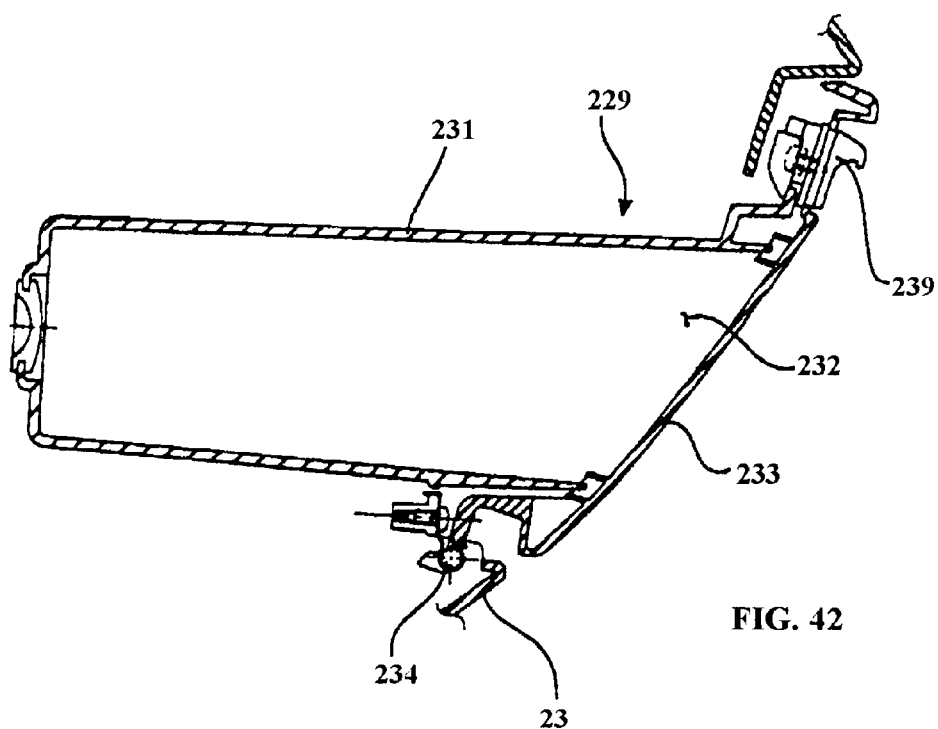
FIG. 42 is an enlarged cross sectional view taken along the line 42—42 of FIG. 32.

The upper cover 23 also provides access to a storage compartment, which is shown best in FIGS. 12, 32 and 42 and is indicated generally by the reference numeral 229. This includes a box-like housing member 231 that forms a storage compartment 232, which is normally closed, by a cover member 233 that is hinged to the box 229 by means of a hinge 234. A latch 235 retains the cover member 233 in its closed position. A suitable key may be provided for this latch.

It will be seen from FIG. 12 that the box-like member 231 has a tapering configuration with the mouth having a wider opening L1 then the base L2 thereof. This is so as to provide clearance for the pivotal movement of the front forks 4 through the range shown in FIGS. 9 and 12. If desired, the positions of the container box 229 and the main switch 225 may be reversed so long as they do not interfere with the steering movement of the front forks 4.

Preferably, the storage compartment 229 is formed integrally with the foot rest 209 at the respective side of the body so as to eliminate the number of external connections that are necessary.

A number of the body cover parts are detachably connected to the sub-frame, which has been previously referred to. For example and as seen in FIG. 45, the leg shields 208 have portions that are fixed by threaded fasteners 236 and nuts 237 to a mounting bracket 238 that is affixed to the sub-frame tube 53. The foot pad 212 of the foot rest 211 and 214 covers this threaded fastener. An under-panel 239 of the body assembly appears in this figure and also may be seen in FIG. 44.

It will be seen therefore that the foot rests provided by the leg shield portion 208 and the rearwardly extending portion 211 is carried by the sub-frame assembly and thus the more heavily loaded portions are carried by this sub-frame assembly. Thus, it is not necessary to form special attachment brackets on the main frame to complicate and otherwise add to the weight and possible interference with the running components as with prior art type constructions.

Also, because the various sub-frame components are disposed outwardly of the forks 4, it is possible to do this without complicated the frame structure or interfering with the operation of the machine.

Figure 44:
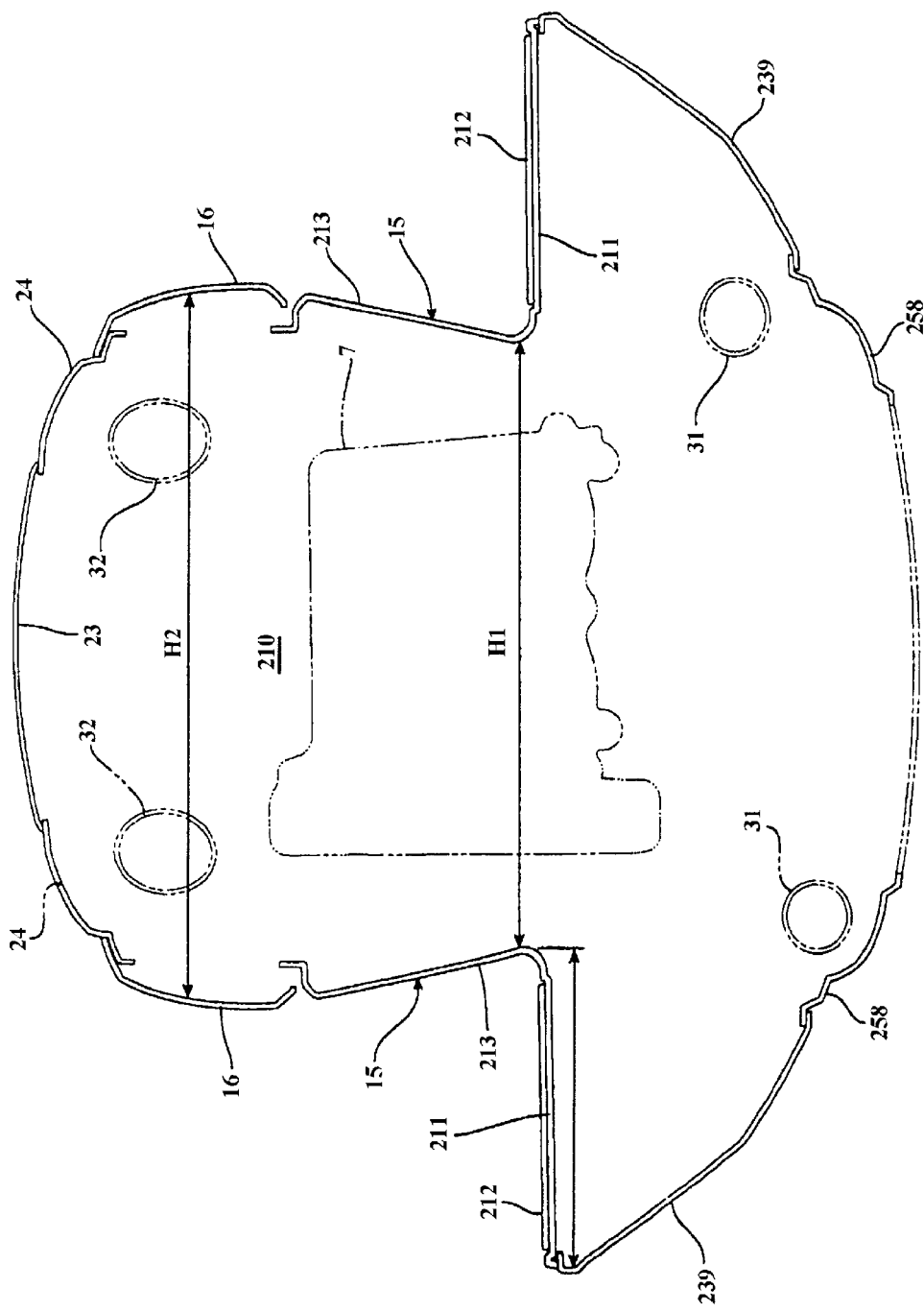
FIG. 44 is an enlarged cross sectional view taken along the line 44—44 of FIG. 34.
Figure 45:
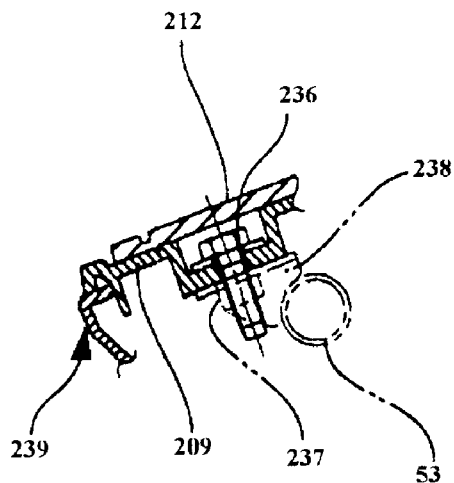
FIG. 45 is an enlarged cross sectional view taken along the line 45—45 of FIG. 33.

Referring now to FIG. 44, it will be seen that the boomerang covers 16 and side panels and foot rests 15 form a generally tunnel shaped area, indicated generally by the reference numeral 210 that has a width H1 in the area of the footrest 211 which is substantially narrower than the width H2 immediately under the seat 8. This provides a more comfortable seating position for the riders and affords a wide footrests area on each side of the body cover assembly.

In addition this provides adequate clearance for the engine assembly 7. As previously noted, the carburetor 135 and intake air duct 134 pass through this tunnel 210. The relationship to the frame tubes 31 and 32 also appears in this figure. Thus, it should also be apparent that removable of the various body cover panels permits servicing of these components without sacrificing the rigidity of the structure.

As seen in FIG. 31, removable body panels 221 may be provided at the sides of the motorcycle 1, one of which may be removed so as to access the radiator fill cap 138 (FIG. 6).

Figure 33:
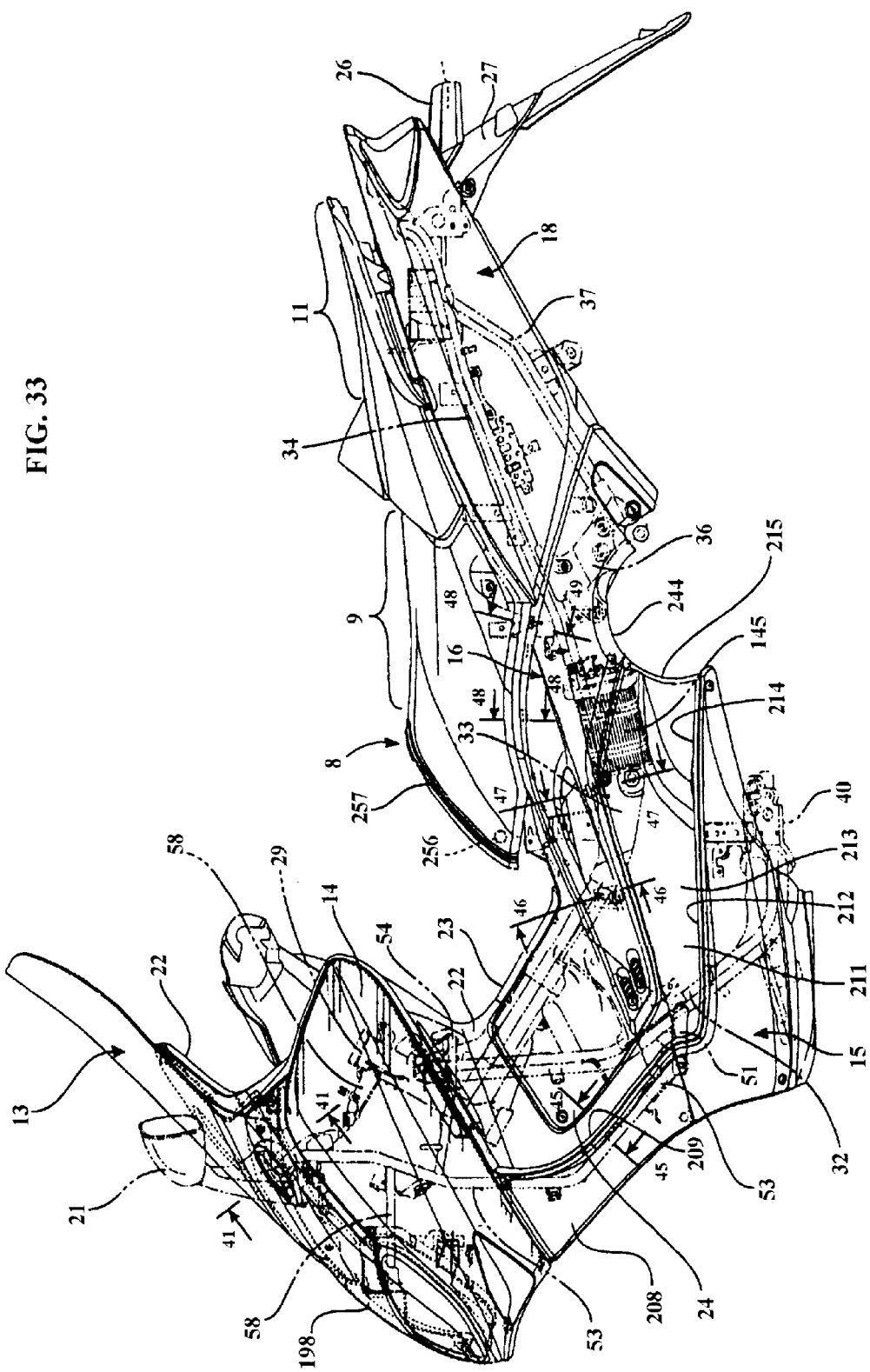
FIG. 33 is a view looking in the same direction as FIG. 1 and shows the relationship of the body cover to certain of the frame elements, which are show in phantom line views.

As may be seen in FIGS. 33 and 34, and as also shown in FIG. 1, the side portions 213 of the side panels and foot rests 15 extend upwardly and terminate in a spaced relationship to the seat undercover 18. The boomerang cover 16 named as aforenoted for their shape, fill a portion of this gap. Above the front part of the boomerang covers 16 the side covers 24 and upper cover 23 complete the enclosure of the frame assembly 28. The attachment of these components will now be described by particular reference to FIGS. 46 through 49.

Figure 46:
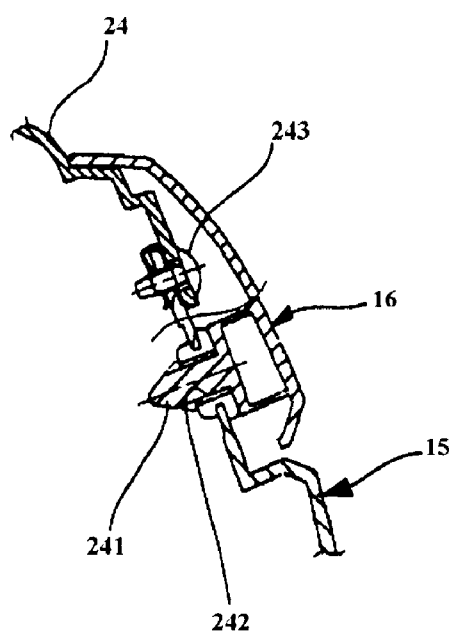
FIG. 46 is an enlarged cross sectional view taken along the line 46—46 of FIG. 33.

As seen in FIG. 46, the boomerang covers 16 are formed with an integral pins 241 that snaps into a fitting openings 242 that are formed in the respective side panels and foot rests 15. The side panels and foot rests 15 are, in turn, connected to the side cover 24 by means of threaded fasteners 243. Similar attachments may be formed at spaced locations along its length. It should also be noted from FIGS. 33 and 34 that the boomerang covers 16 have recesses or cut outs 244 by their natural shape which cooperate with the foot rest recess 215 to also clear the crankcase transmission assembly 39 of the engine assembly 7.

Figure 47:
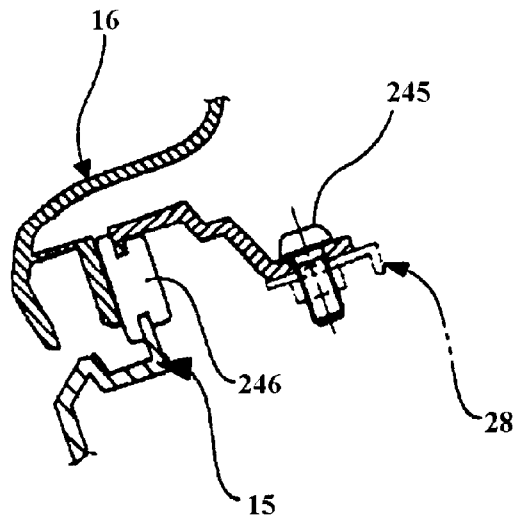
FIG. 47 is an enlarged cross sectional view taken along the line 47—47 of FIG. 33.
Figure 48:
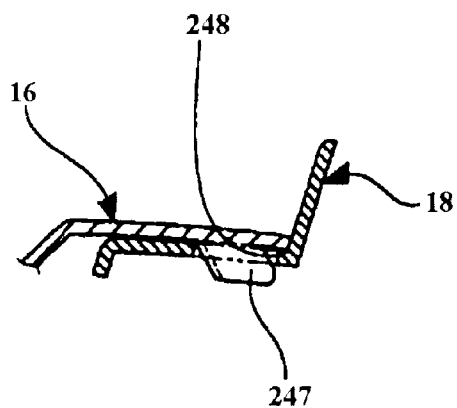
FIG. 48 is an enlarged cross sectional view taken along the line 48—48 of FIG. 33.
Figure 49:
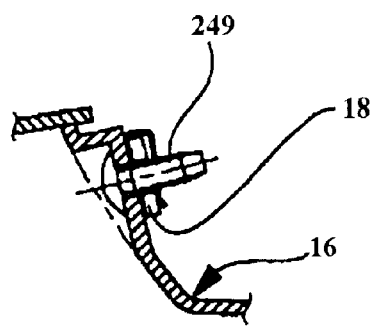
FIG. 49 is an enlarged cross sectional view taken along the line 49—49 of FIG. 33.

As seen in FIG. 47, the foot rest and particularly it side portion 213 has an inwardly extending flange that is affixed to the frame assembly 28 by threaded fasteners 245. In addition, a grommet 246 serves to connect this portion of the side panels and foot rests 15 to the lower end of the boomerang cover 16.

More rearwardly, the boomerang covers 16 are formed with an extended tab 247 that is adapted to be snapped into a receiving opening 248 formed in the seat underside cover 18. Similar connections are formed along the length of the boomerang covers 16. Finally, at the rear thereof the boomerang covers 16 are affixed to the seat underside cover 18 by means of a threaded fastener 249.

It should be noted that all of the body cover parts heretofore described are formed from suitable plastic materials and the color scheme for the various covers may be changed to provide individual design flexibility. Also, because of the overlapping relationship between the components, the accuracy of their inter fitting need not be as precise. Furthermore, the components can be readily removed for accessing and servicing parts of the frame assembly 28 and engine assembly 7.

Figure 50:
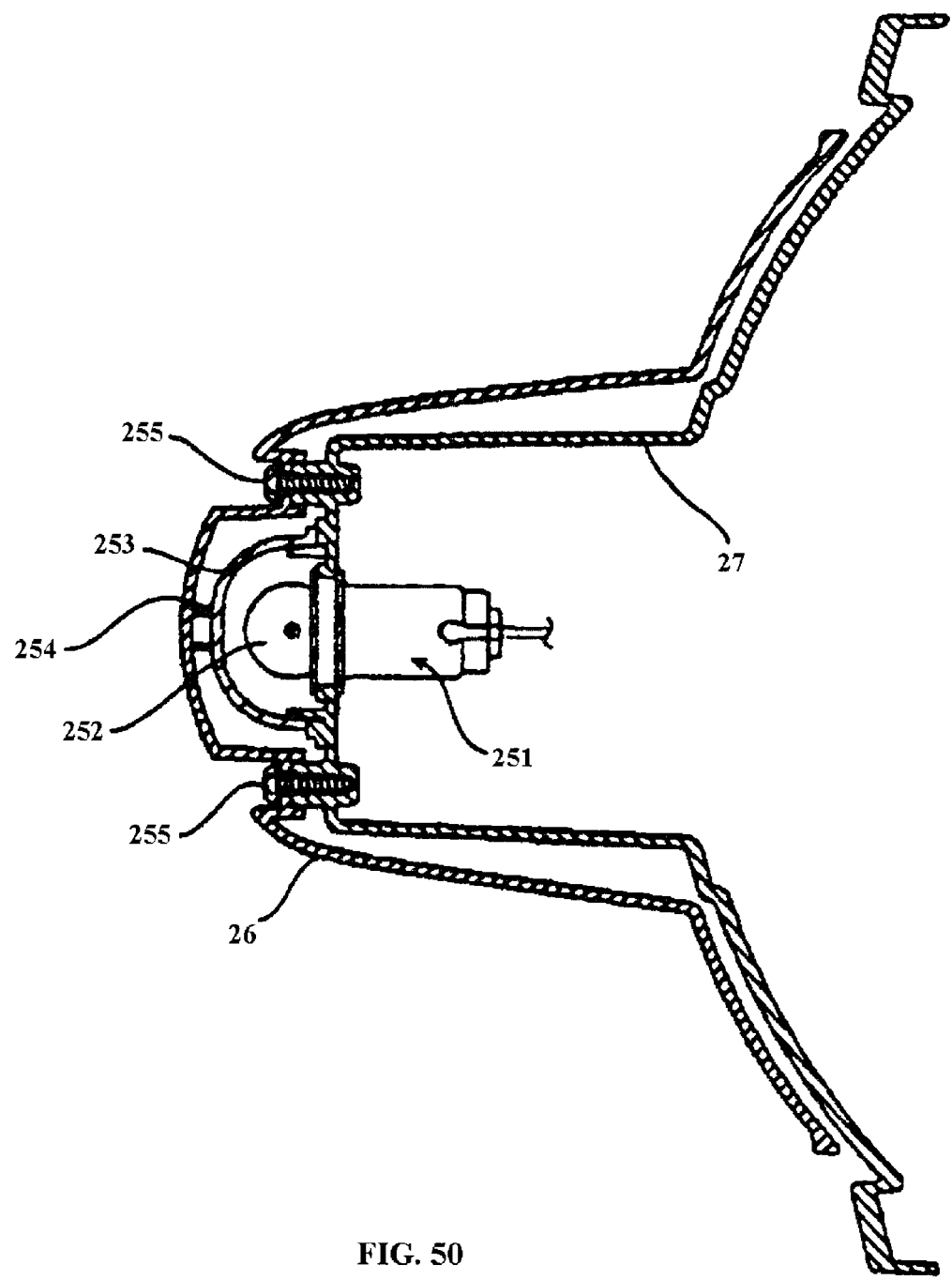
FIG. 50 is an enlarged cross sectional view taken along the line 50—50 of FIG. 2.

Turning now to the rear of the body coverings and specifically to FIG. 50, the aforenoted battery 175 is covered at the rear end portion by the rear portion of the seat 8 and the tail cover 25. Below this, the license bracket 27 is adapted to receive the license plate, which is illuminated by a lamp that is contained within the license lamp cover 26.

This lamp structure is shown in FIG. 50 and includes a bulb holder 251 in which a bulb 252 is snapped attached. A lens 253 is affixed over this bulb 252 and is held in place by a projection 254 that is fixed to the license lamp cover 26 and which is pressed against the license bracket 27 by screw fasteners 255 that secure the license lamp cover 26 to the license bracket 27. This provides a very simple assembly and minimizes assembly and service time.

Returning now to more description of the seat 8, it has been previously mentioned that the seat is pivotal so as to access the fuel tank 140 as well as the container box 163. To this end, there is provided a hinge assembly 256 (FIGS. 1, 5 and 6) at the forward portion of the seat 8 in an area below a front seat part 257. A lock (not shown) may be provided at the rear portion of the seat 8 so as to provide security for both the fuel tank 140 and the container box 163.

It should be noted that the seat 8 is placed so that the rider or passenger's portion 11 is disposed generally forwardly of the rear axle 63 so as to provide a more comfortable seating position and also to provide more togetherness with the operator/rider.

As may be best seen in FIGS. 5 and 6, the upper surface 142 of the fuel tank 140 extends substantially above the top of the container box 163 so that the fuel tank 140 will have a large fuel capacity. The fuel tank 140 is disposed generally adjacent the hinge 256 and under the forward seat portion 257 which is rarely used and thus, can be very thin and not cushioned significantly. This facilitates the use of the maximum fuel tank capacity.

It has been noted that the fuel tank 140 may be accessed by pivoting the seat 8 about the hinge 256. However, for ease of refueling the front portion 257 of this seat is provided with a lockable access-opening panel, which does not appear in the drawings but which is makes it unnecessary for the rider to pivot the entire seat 8 for mere refueling purposes.

Also, the lower position for the container box 163 means that heavy objects need not be lifted as high to be placed into it. The seat 8 also is disposed so as to be narrower at the front and wider at the rear so as to permit a wide space for the container box 163 so that even though it has a low height, it will have good storage capacity.

Figure 51:
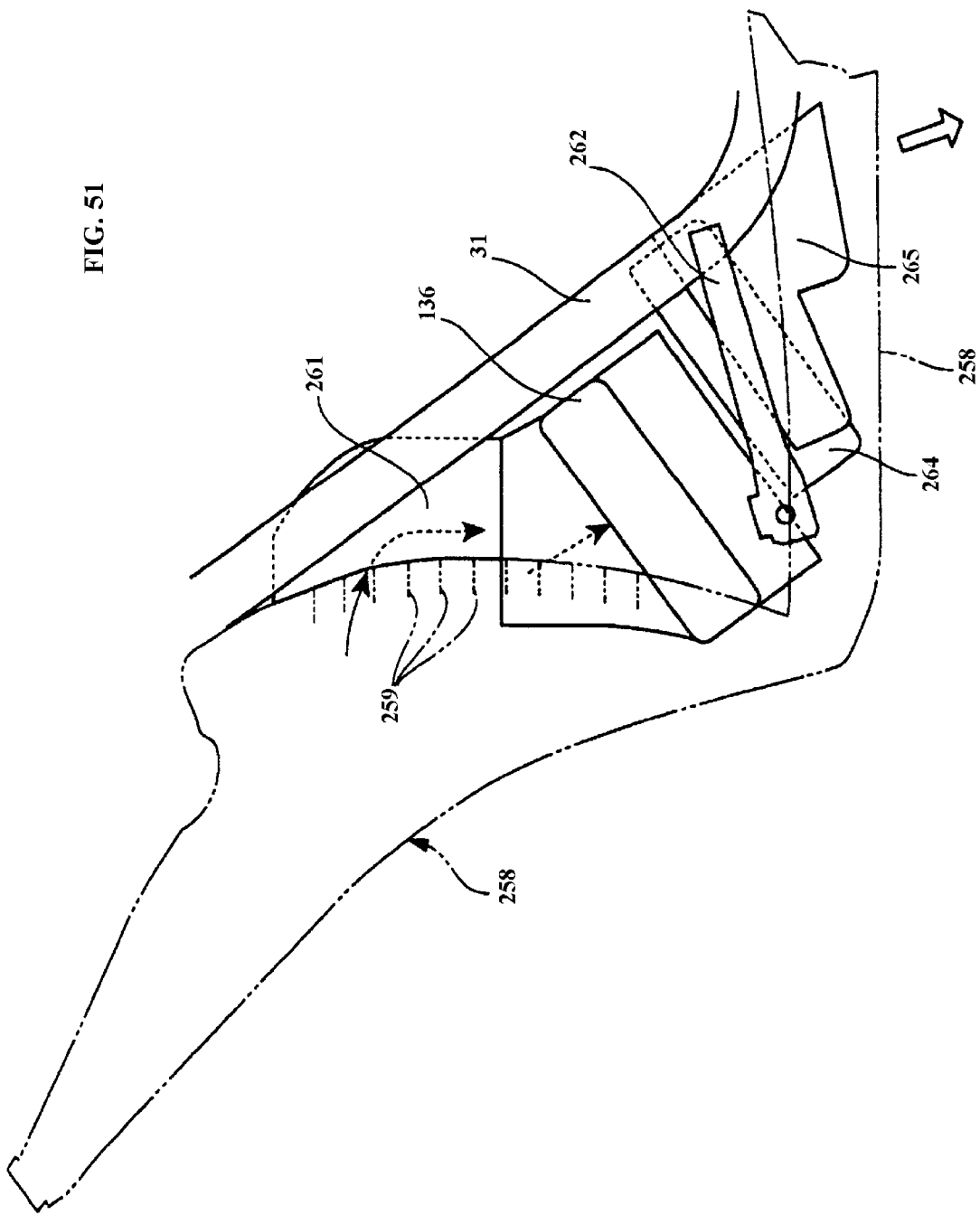
FIG. 51 is a schematic side view showing the relationship of the radiator and the airflow path for delivering air to the radiator.
Figure 52:
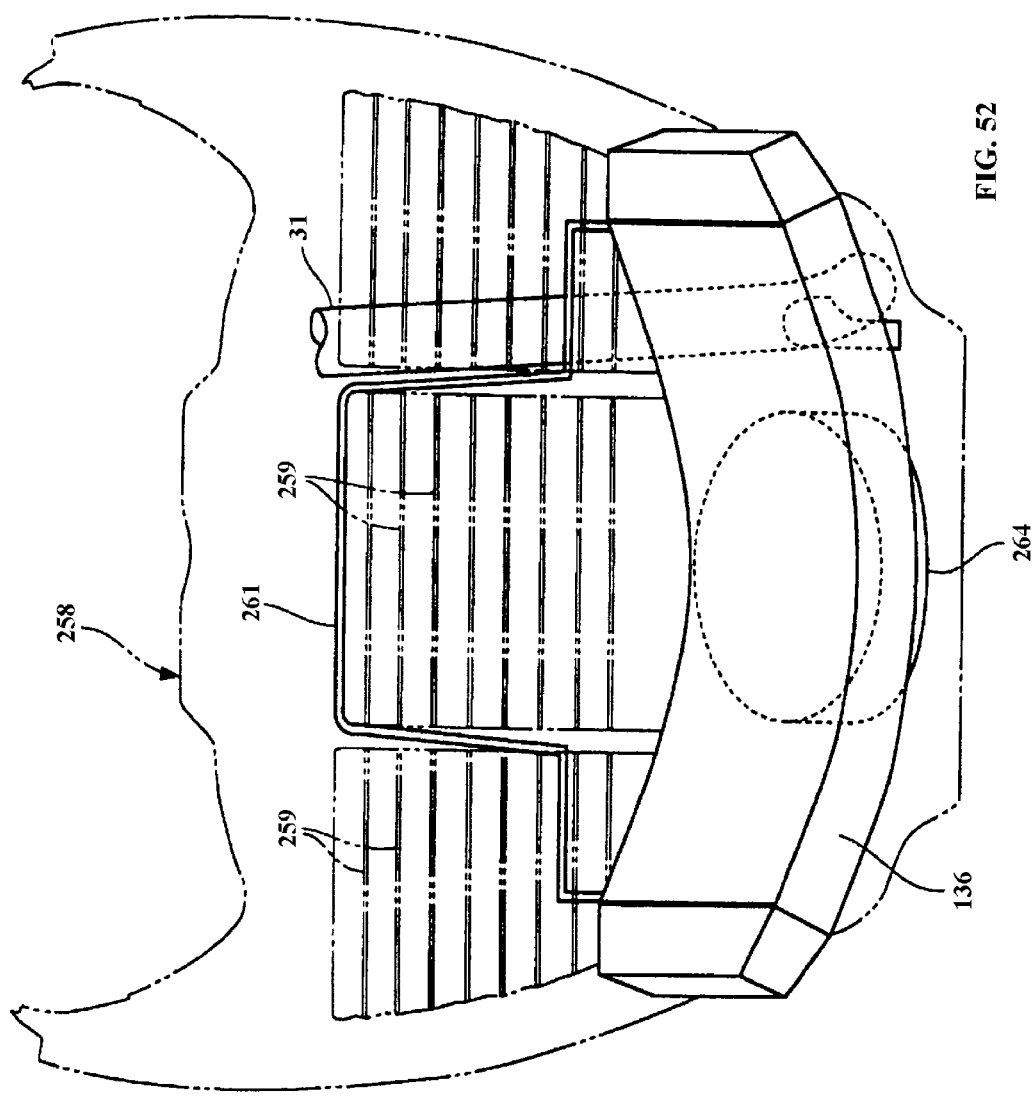
FIG. 52 is a schematic view showing the relationship of the inner fender and the radiator for the engine.
Figure 53:
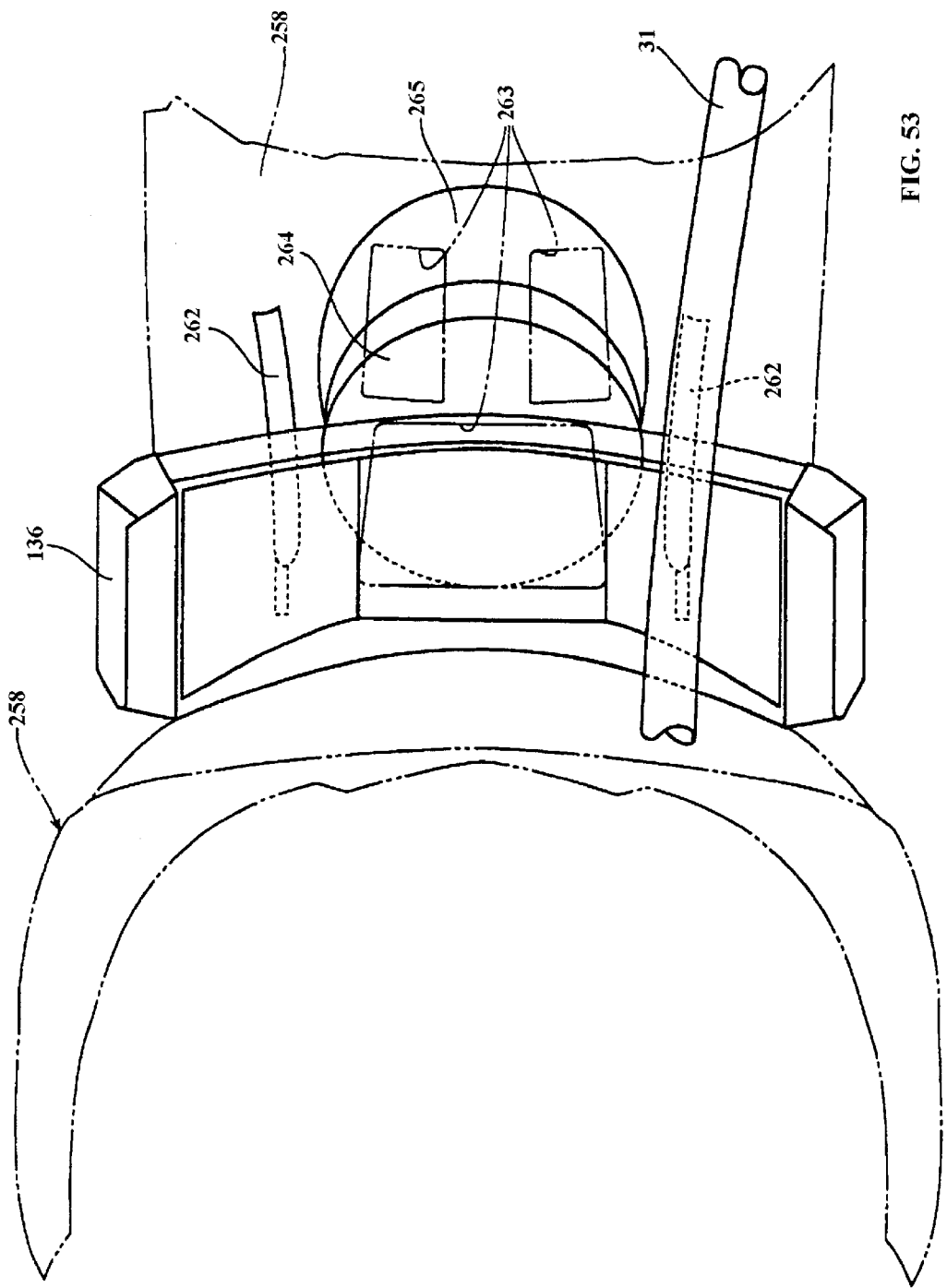
FIG. 53 is a schematic plan view showing the relationship of the radiator and the components as seen in FIGS. 51 and 52.

The remaining body cover part to be described comprises an inner fender indicated generally by the reference numeral 258 and which is shown best in FIGS. 51 through 53, the later figures showing its relationship to the aforementioned engine cooling system radiator 136. It will be seen that the inner fender 258 is provided with a plurality of air admitting louvers 259 configured to exclude the entry of road dirt. Behind these louvers 259 there is provided an air deflector screen 261 which channels the intake air flow as shown by the arrows in FIG. 51 downwardly across the radiator 136.

As seen in this figure, the radiator 136 is mounted to the frame down tubes 31 in this area by means of supporting brackets 262.

In addition, the lower portion of the inner fender 258 is provided with a further slotted air inlet openings 263 (FIG. 31) so as to provide added and adequate airflow. A cooling fan 264 is also provided on the backside of the radiator 136 so as to insure adequate airflow across it. A shroud 265 surrounds the fan 264 and directs the airflow downwardly away from the rider.

Other Details Associated with the Running Components

Figure 27:
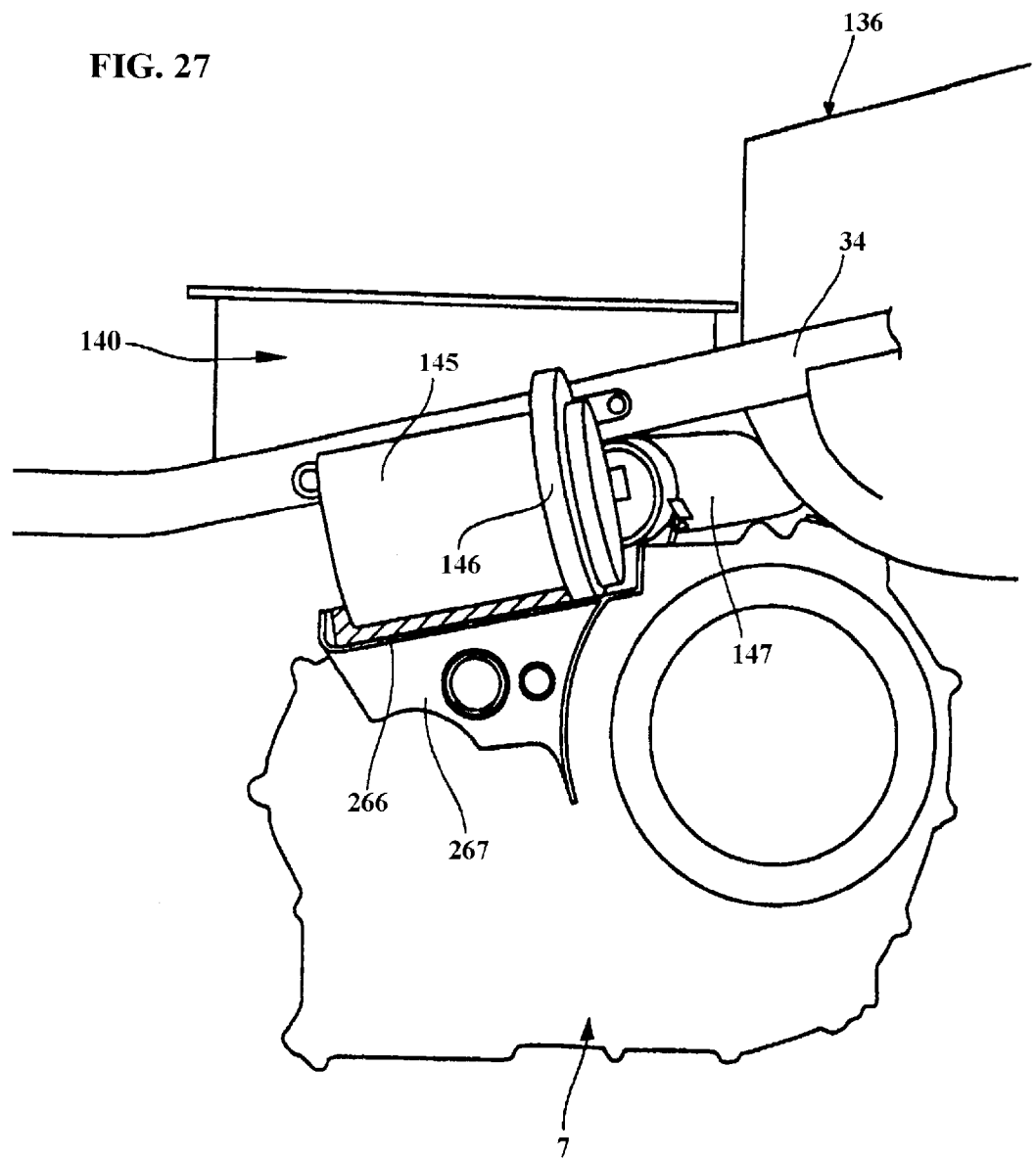
FIG. 27 is an enlarged side elevational view taken in the same direction as FIG. 5 and shows the arrangement for supplying cooling air to the variable speed transmission of the engine assembly.
Figure 28:
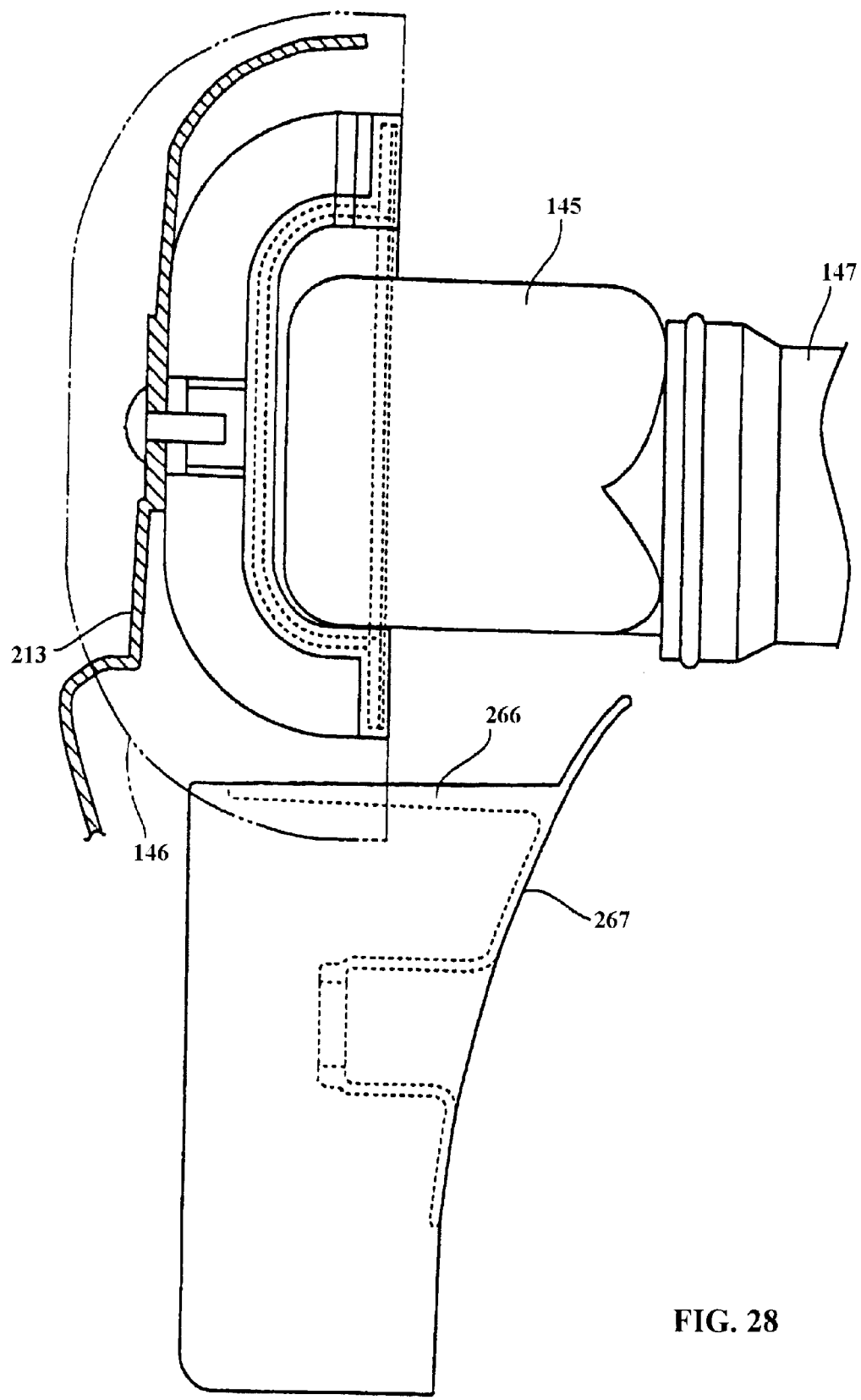
FIG. 28 is an enlarged rear elevational view of the structure shown in FIG. 27 and illustrates the air filter element associated therewith.
Figure 29:
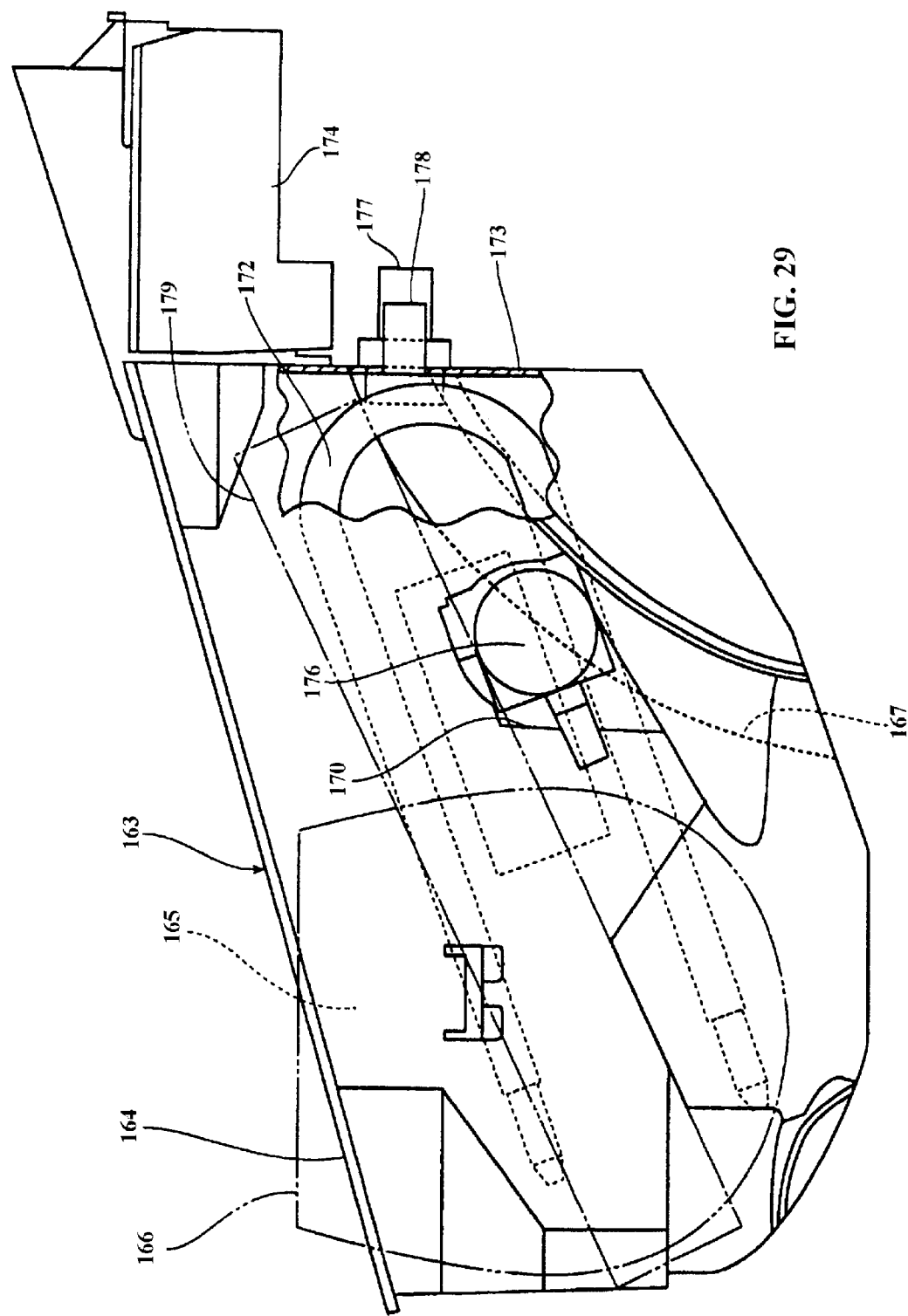
FIG. 29 is a side elevational view of the container box, with portions broken away and showing certain of the components, which may be contained within it.
Figure 30:
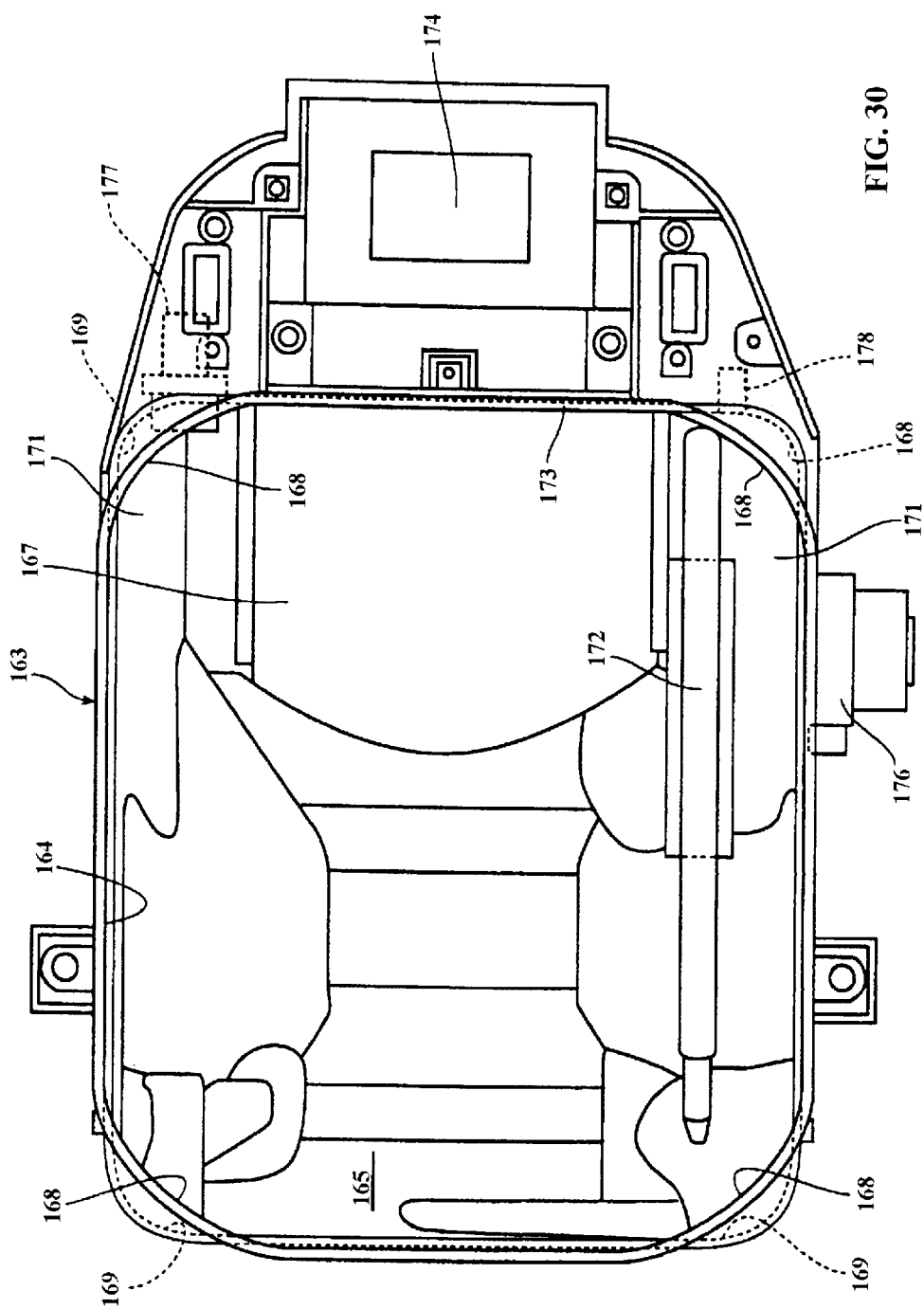
FIG. 30 is a top plan view of the structure shown in FIG. 29 but omitting the showing of the helmet.

It has been previously noted that the CVT transmission of the engine assembly 7 is air cooled by air supplied through the system shown in FIGS. 27 and 28. In order to protect the further element 145 from accumulating foreign material, there is provided a baffle or shield 266 that underlies the filter element 145 as seen in these two figures and which is affixed to the engine assembly 7 by means of a vertically extending wall 267 thereof. This baffle 266 precludes mud and road dirt from being thrown up and clogging the filter element 145 even though it is otherwise partially protected by the cover 146.

Referring now primarily to FIGS. 6 and 7, one of the backstays 34 can have mounted to it a plurality of electrical components 268, which are mounted on a mounting board 269.

Figure 54:
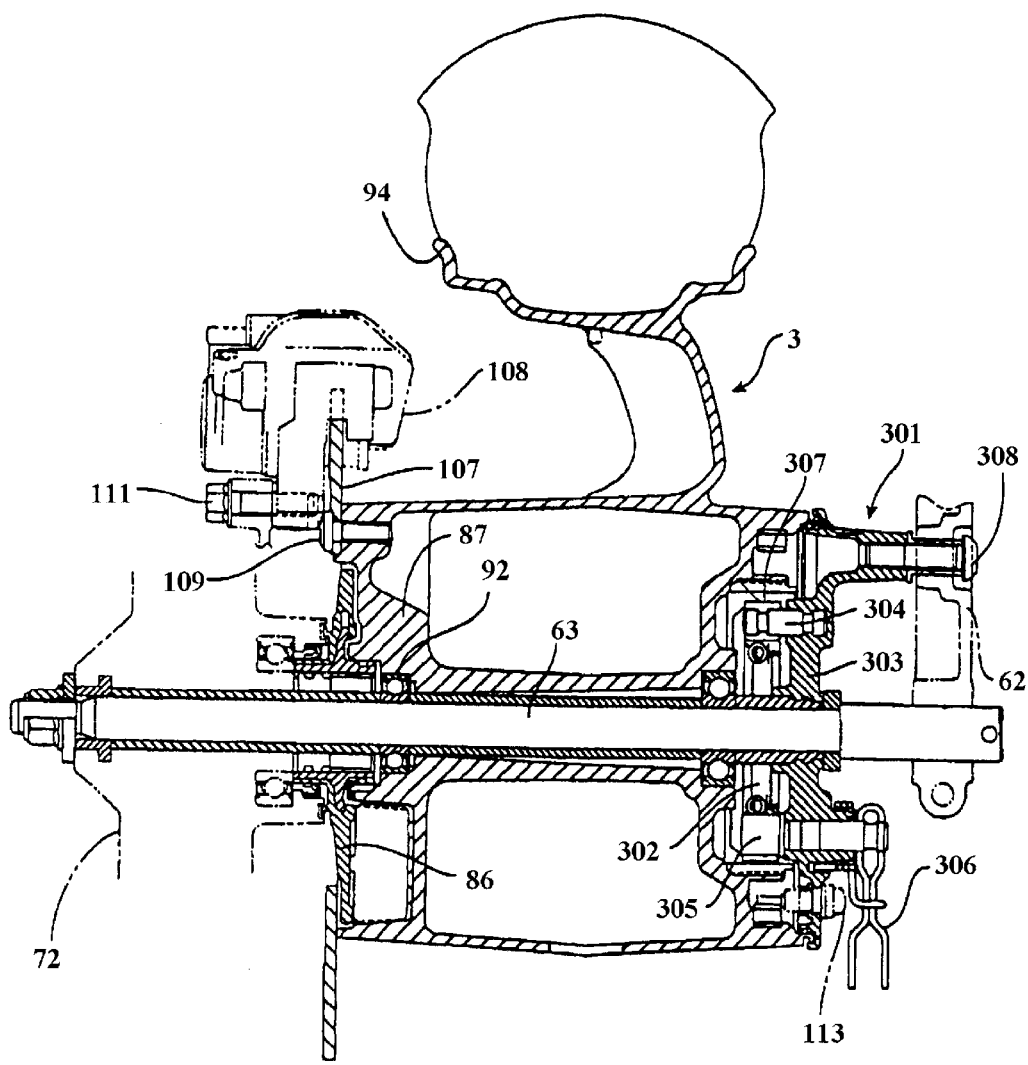
FIG. 54 is a cross sectional view in part similar to FIG. 18 and shows a second embodiment of the invention.

Second Embodiment (FIG. 54)

Figure 18:
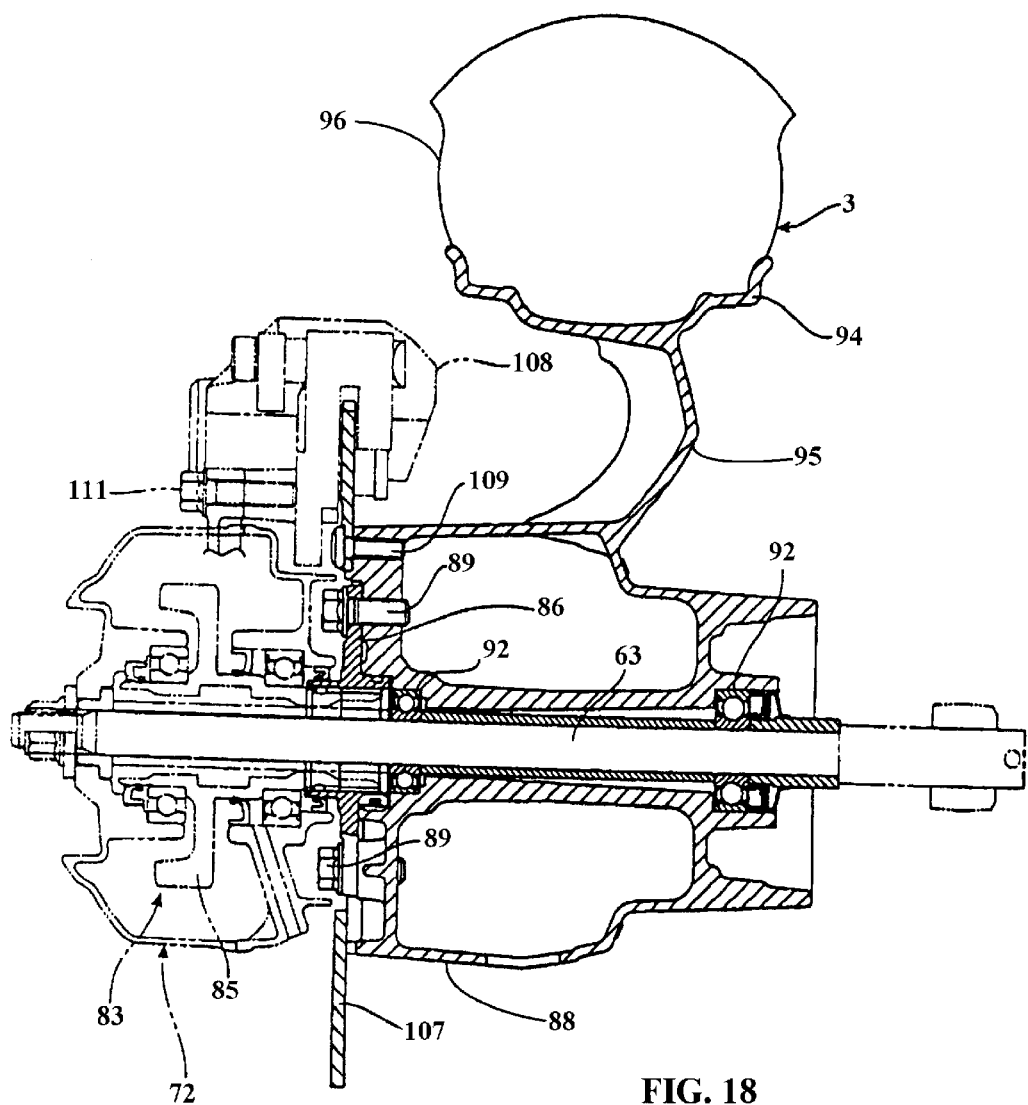
FIG. 18 is a cross sectional view taken along a plane perpendicular to the broken away portion of FIG. 16 and shows in more detail the relationship of the brake components.
Figure 19:
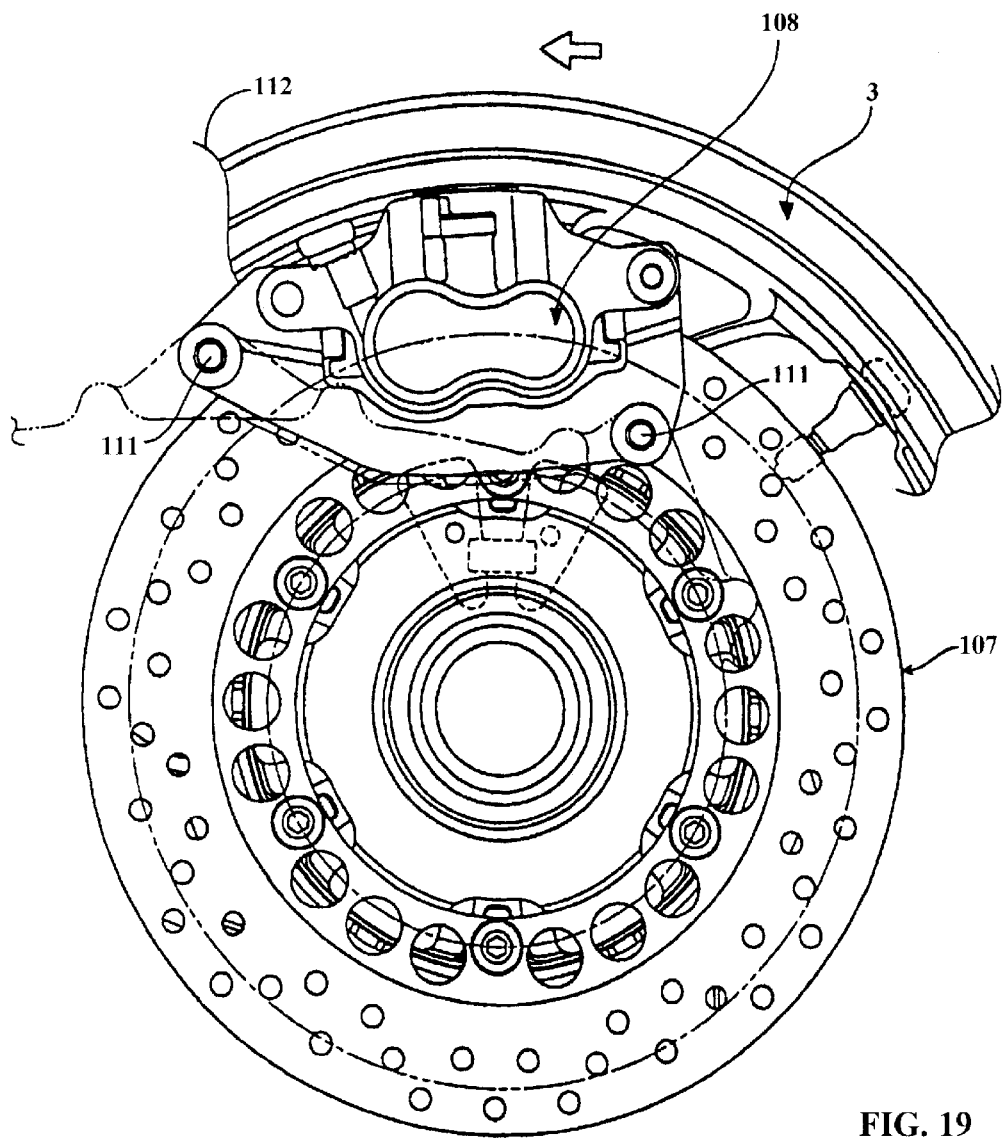
FIG. 19 is a side elevational view of the construction shown in FIG. 18.
Figure 20:
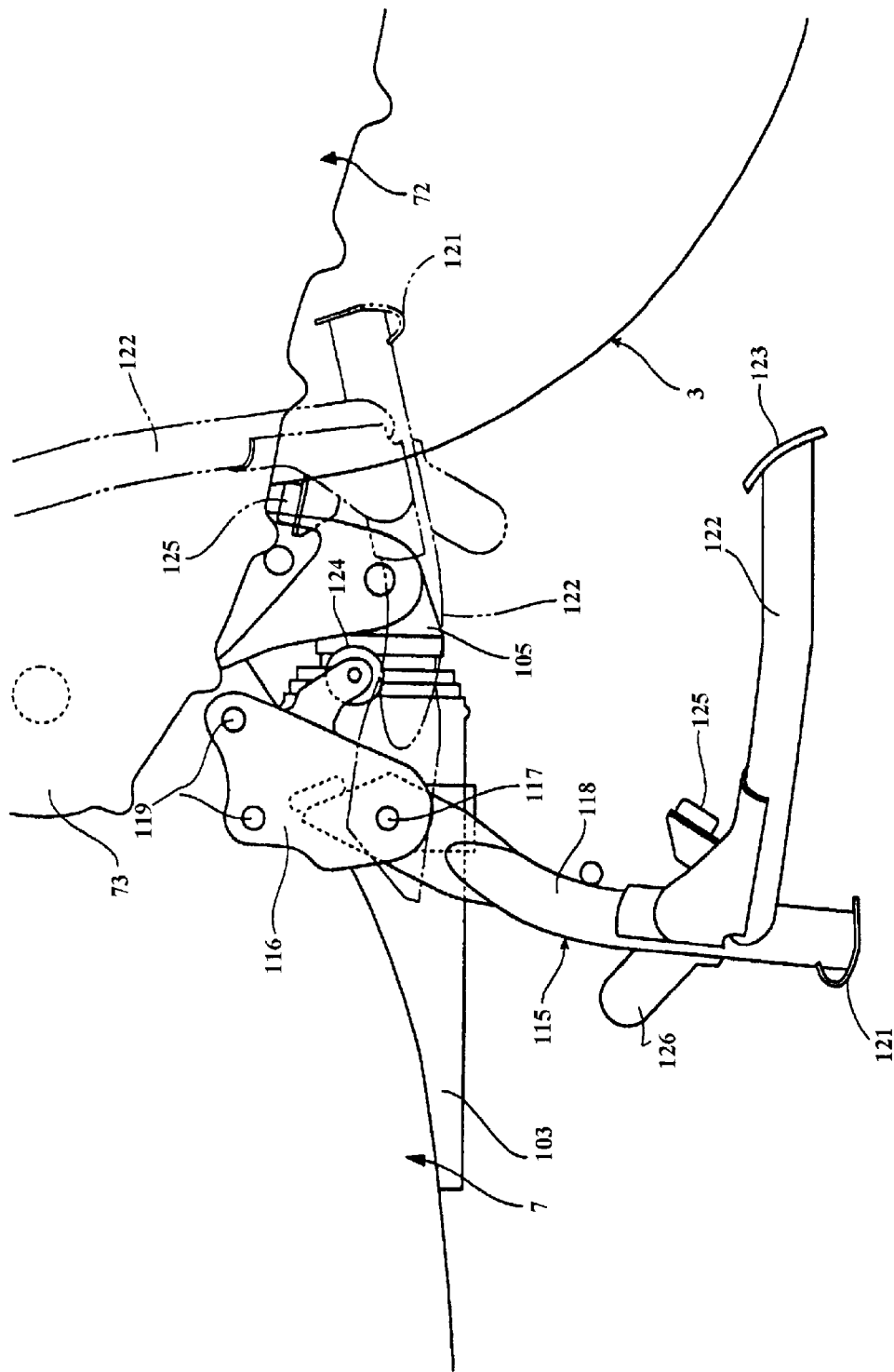
FIG. 20 is an enlarged side elevational view, showing the kickstand and looking in the same direction as FIG. 1 showing the kickstand in its operative position in solid lines and in its retracted position in phantom lines.
Figure 21:
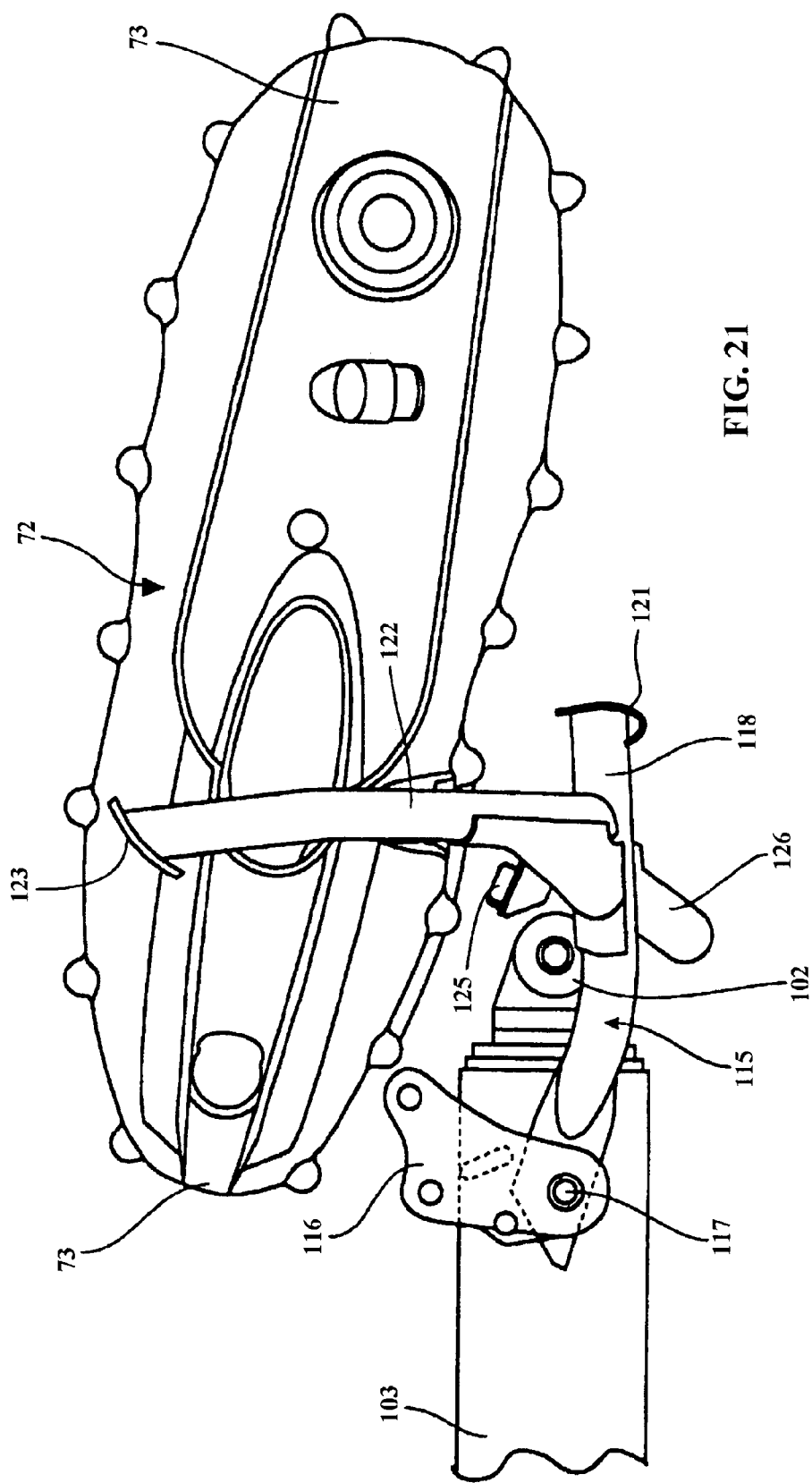
FIG. 21 is a side elevational view of the parts shown in FIG. 20, showing some additional components and illustrating the kickstand in its retracted position as shown in phantom lines in FIG. 20.

FIG. 54 shows a second embodiment of the invention and this embodiment deals primarily with the rear brake assembly and can be compared with the first embodiment by comparing with FIG. 18. In addition to the disc brake assembly comprised of the brake disc 107 and caliper 108, there is provided a drum type parking brake, indicated generally by the reference numeral 301.

In connection with this, the wheel and specifically the hub portion 88 is formed with an annular drum braking surface that is adapted to be engaged by brake shoes 302 that are pivotally supported on a backing plate 303 by pivot pins 304. A cam 305 is operated by a brake lever 306 so as to pivot the brake shoes 302 into engagement with a drum surface 307 formed by the wheel 3. The backing plate 303 is fixed to the wheel 3 by fasteners 308.

Thus, from the foregoing description it should be readily apparent that the described body cover construction and associated motorcycle provides great design flexibility while at the same time permitting good rider and passenger seating and ease of access for servicing without having to remove a large number of parts. Of course, the foregoing description is that of preferred embodiments of the invention and various changes and modifications may be made without departing from the spirit and scope of the invention, as defined by the appended claims.

What is claimed is:

1. A vehicle comprised of a frame assembly including a head pipe for journalling a front wheel for steering about a steering axis and a plurality of frame members rigidly affixed to each other, a seat carried by said frame assembly and adapted to accommodate at least a single rider seated in straddle fashion, a rear wheel supported by said frame assembly for suspension movement relative thereto, an engine transmission assembly carried by and forming a part of said frame assembly for driving said rear wheel, and a body cover assembly comprised of a plurality of body cover parts each detachably connected to said frame assembly and substantially concealing said frame assembly, said body cover assembly being comprised of at least three separate components at each side in the area below the seat, said three separate components of the body cover assembly comprising a foot rest adapted to support the feet of a rider seated on the seat and extending there beneath, a seat undercover covering the portion of the frame assembly beneath said seat, and a boomerang cover having a pair of angularly related leg portions covering the area of the frame assembly beneath said seat undercover.

2. A vehicle as set forth in claim 1 wherein the foot rests are comprised of forward, upwardly extending leg shield portions the trailing sides thereof being operative to receive a rider's foot, rearwardly extending horizontal surfaces also adapted to receive the rider's feet and vertically extending side cover portions.

3. A vehicle as set forth in claim 2 wherein the foot rest vertically extending side cover portions terminate adjacent the boomerang covers.

4. A vehicle as set forth in claim 2 wherein the engine transmission assembly includes a crankcase in which a crankshaft is journalled for rotation about a transverse axis and the body cover assembly is formed with cut outs for exposing at least a portion of the crankcase beneath the seat so a rider can place his feet on the ground in close proximity to said crankcase and so said crankcase can be exposed to the atmosphere for cooling.

5. A vehicle as set forth in claim 4 wherein the cut outs for exposing at least a portion of the crankcase are formed in the foot rest and the boomerang cover.

6. A vehicle as set forth in claim 5 wherein the cut outs formed in the foot rest is formed in a vertically extending part thereof that is juxtaposed to one leg of the boomerang cover.

7. A vehicle as set forth in claim 1 wherein the engine transmission assembly includes a crankcase in which a crankshaft is journalled for rotation about a transverse axis and the body cover assembly is formed with cut outs for exposing at least a portion of the crankcase beneath the seat so a rider can place his feet on the ground in close proximity to said crankcase and so said crankcase can be exposed to the atmosphere for cooling.

8. A vehicle as set forth in claim 7 wherein the cut outs for exposing at least a portion of the crankcase are formed in two of the three components.

9. A vehicle as set forth in claim 8 wherein the boomerang cover has a pair of angularly related leg portions covering the area of the frame assembly beneath said seat undercover.

10. A vehicle as set forth in claim 9 wherein the cut outs for exposing at least a portion of the crankcase are formed in the foot rest and the boomerang cover.

11. A vehicle as set forth in claim 10 wherein the cut outs formed in the foot rest is formed in a vertically extending part thereof that is juxtaposed to one leg of the boomerang cover.

12. A vehicle comprised of a frame assembly including a head pipe for journalling a front wheel for steering about a steering axis and a plurality of frame members rigidly affixed to each other, a seat carried by said frame assembly and adapted to accommodate at least a single rider seated in straddle fashion, a rear wheel supported by said frame assembly for suspension movement relative thereto, an engine transmission assembly carried by and forming a part of said frame assembly for driving said rear wheel, said frame assembly including a sub frame fixed relative to and surrounding said head pipe and a body cover assembly comprised of a plurality of body cover parts each detachably connected to said frame assembly and substantially concealing said frame assembly, said body cover assembly being comprised of at least a pair of foot rests adapted to support the feet of a rider seated on the seat and extending there beneath, said foot rests being affixed to said sub frame for supporting the rider's feet.

13. A vehicle as set forth in claim 12 wherein the foot rests are comprised of forward, upwardly extending leg shield portions the trailing sides thereof being operative to receive a rider's foot and rearwardly extending horizontal surfaces also adapted to receive the rider's feet.

14. A vehicle as set forth in claim 13 wherein the seat extends rearwardly a distance to accept a rider passenger in tandem with a rider operator and the foot rest rearwardly extending horizontal surfaces also is adapted to receive the rider passenger's feet.

15. A vehicle as set forth in claim 12 wherein the sub frame includes a rearwardly extending hoop shaped section to which the foot rests are affixed.

16. A vehicle as set forth in claim 15 wherein the sub frame further includes a forwardly extending hoop shaped section to which a wind shield is affixed.

17. A vehicle as set forth in claim 16 wherein the front fork comprises a pair of transversely spaced fork elements surrounded by the sub frame hoop shaped sections.

18. A vehicle as set forth in claim 17 wherein the foot rests are comprised of forward, upwardly extending leg shield portions the trailing sides thereof being operative to receive a rider's foot and rearwardly extending horizontal surfaces also adapted to receive the rider's feet.

19. A vehicle as set forth in claim 18 wherein the seat extends rearwardly a distance to accept a rider passenger in tandem with a rider operator and the foot rest rearwardly extending horizontal surfaces also are adapted to receive the rider passenger's feet.

20. A vehicle comprised of a frame assembly including a head pipe for journalling a front wheel for steering about a steering axis and a plurality of frame members rigidly affixed to each other, a seat carried by said frame assembly and adapted to accommodate at least a single rider seated in straddle fashion, said seat extending rearwardly a distance to accept a rider passenger in tandem with a rider operator a rear wheel supported by said frame assembly for suspension movement relative thereto, an engine transmission assembly carried by and forming a part of said frame assembly for driving said rear wheel, and a body cover assembly comprised of a plurality of body cover parts each detachably connected to said frame assembly and substantially concealing said frame assembly, said body cover assembly being comprised of at least three separate components at each side in the area below the seat comprising a foot rest adapted to support the feet of a rider operator seated on the seat and extending there beneath, a seat undercover covering the portion of the frame assembly beneath said seat, and a boomerang cover having a pair of angularly related leg portions covering the area of the frame assembly beneath said seat undercover, said engine assembly exhausting combustion products to the atmosphere through a muffler disposed below said seat undercover and above an axle about which said rear wheel rotates, and a pair of tandem foot rests each fixed to said frame assembly at a respective side thereof and forwardly of said muffler.

21. A vehicle as set forth in claim 20 wherein the pair of tandem foot rests are pivotally supported from the frame assembly between an outwardly positioned, operative position and in inwardly positioned, storage position.

22. A vehicle as set forth in claim 21 wherein the tandem foot rests lie forwardly of the muffler in each of their positions.

23. A vehicle as set forth in claim 22 wherein the tandem foot rests are received in recesses formed in the boomerang covers when in their inwardly positioned, storage positions.

* * * * *